United States Patent
Fujimoto et al.

(10) Patent No.: US 10,666,849 B2
(45) Date of Patent: May 26, 2020

(54) IMAGING CONTROL DEVICE, IMAGING CONTROL METHOD, AND IMAGING CONTROL SYSTEM WITH MOVING IMAGE PROCESSING THAT ADAPTS TO RECEIVED RADIO WAVE STRENGTH

(71) Applicant: Sony Corporation, Tokyo (JP)

(72) Inventors: Yusuke Fujimoto, Kanagawa (JP);
Masahiro Watanabe, Kanagawa (JP);
Masahiro Shimizu, Tokyo (JP);
Tetsunori Nakayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/552,083

(22) PCT Filed: Nov. 20, 2015

(86) PCT No.: PCT/JP2015/082642
§ 371 (c)(1),
(2) Date: Aug. 18, 2017

(87) PCT Pub. No.: WO2016/136054
PCT Pub. Date: Sep. 1, 2016

(65) Prior Publication Data
US 2018/0077333 A1     Mar. 15, 2018

(30) Foreign Application Priority Data
Feb. 27, 2015   (JP) ................. 2015-038211

(51) Int. Cl.
*H04N 5/232*     (2006.01)
*G03B 15/00*     (2006.01)
(Continued)

(52) U.S. Cl.
CPC ......... *H04N 5/23203* (2013.01); *G03B 15/00* (2013.01); *G03B 17/38* (2013.01);
(Continued)

(58) Field of Classification Search
CPC .... H04N 5/23203; H04N 5/23216; G01J 1/02
See application file for complete search history.

(56) References Cited

U.S. PATENT DOCUMENTS 8,830,339 B2 * 9/2014 Velarde ............... H04N 5/232
                                                      348/208.16
2012/0147531 A1 * 6/2012 Rabii ............... H04W 52/0254
                                                      361/679.01
(Continued)

FOREIGN PATENT DOCUMENTS

CN     102469953 A    5/2012
CN     104243809 A    12/2014
(Continued)

OTHER PUBLICATIONS

Chinese Office Action dated Sep. 10, 2019 for corresponding Chinese Application No. 201580076456.9.
(Continued)

*Primary Examiner* — Padma Haliyur
(74) *Attorney, Agent, or Firm* — Michael Best & Friedrich LLP

(57) ABSTRACT

[Object] To provide an imaging control device, an imaging control method, and an imaging control system, which can capture an image at a proper timing, while suppressing increase of the cost.
[Solution] The imaging control device includes: an acquisition unit that acquires radio wave strength information indicating strength of a received radio wave; and a control unit that performs imaging control on the basis of a change of the radio wave strength information acquired by the acquisition unit. The imaging control system includes: a communication device that includes a communication unit that transmits a radio wave; and an imaging control device that includes an acquisition unit that acquires radio wave strength information indicating a strength of the radio wave
(Continued)

received from the communication unit of the communication device, and a control unit that performs imaging control on the basis of a change of the radio wave strength information acquired by the acquisition unit.

18 Claims, 24 Drawing Sheets

(51) Int. Cl.
      *G03B 17/38*     (2006.01)
      *H04N 5/225*     (2006.01)
      *H04N 7/18*      (2006.01)
      *G01J 1/02*      (2006.01)

(52) U.S. Cl.
    CPC ............ *H04N 5/225* (2013.01); *H04N 5/232* (2013.01); *H04N 5/23216* (2013.01); *H04N 7/188* (2013.01); *G01J 1/02* (2013.01)

(56) References Cited

U.S. PATENT DOCUMENTS

2014/0323053 A1* 10/2014 Yamaoka .......... H04W 52/0229
                                                                     455/41.2
2015/0062335 A1* 3/2015 Murakami ............ H04W 24/04
                                                                     348/143
2015/0103330 A1* 4/2015 Wilks ...................... G01S 17/36
                                                                     356/5.01
2016/0006988 A1* 1/2016 Zhao ...................... H04N 7/181
                                                                     348/155
2016/0156789 A1* 6/2016 Iwasaki .............. H04N 1/00103
                                                                    358/1.15
2016/0205305 A1* 7/2016 McCarthy .......... H04N 5/23206
                                                                    348/366

FOREIGN PATENT DOCUMENTS

| JP | 2002-024229 A | 1/2002 |
|----|---------------|--------|
| JP | 2004-289433 A | 10/2004 |
| JP | 2013-175819 A | 9/2013 |
| JP | 2014-225831 A | 12/2014 |
| JP | 2015-005860 A | 1/2015 |

OTHER PUBLICATIONS

Japanese Office Action dated Dec. 3, 2019 for corresponding Japanese Application No. 2017-501847.

* cited by examiner

FIG. 4
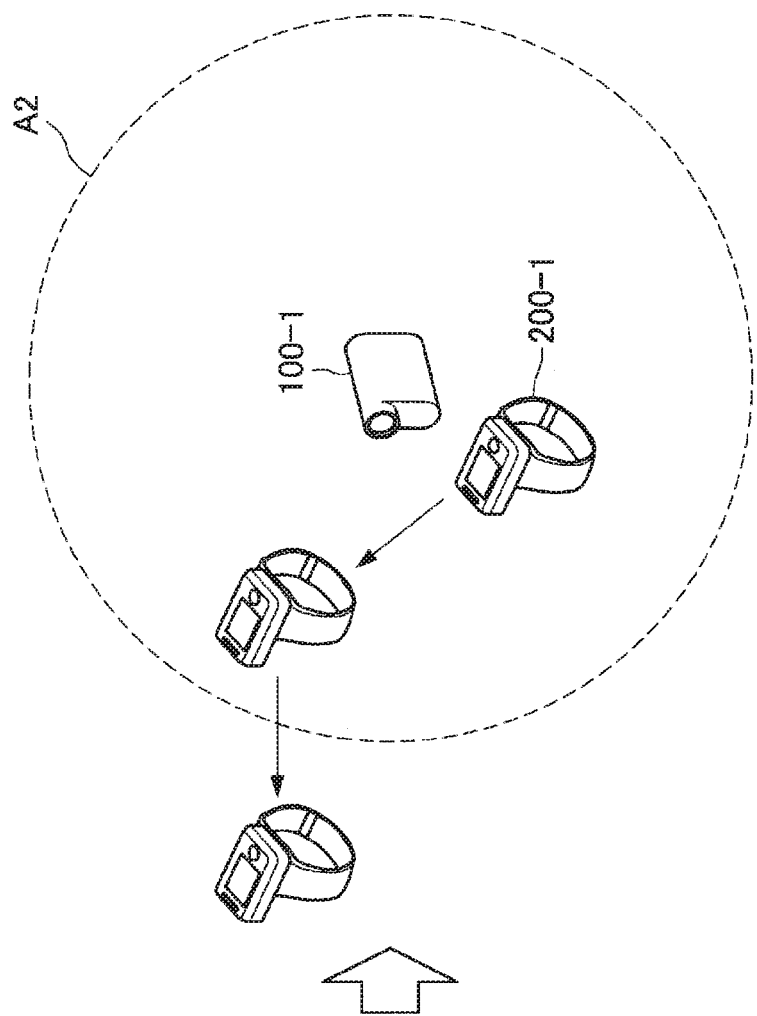
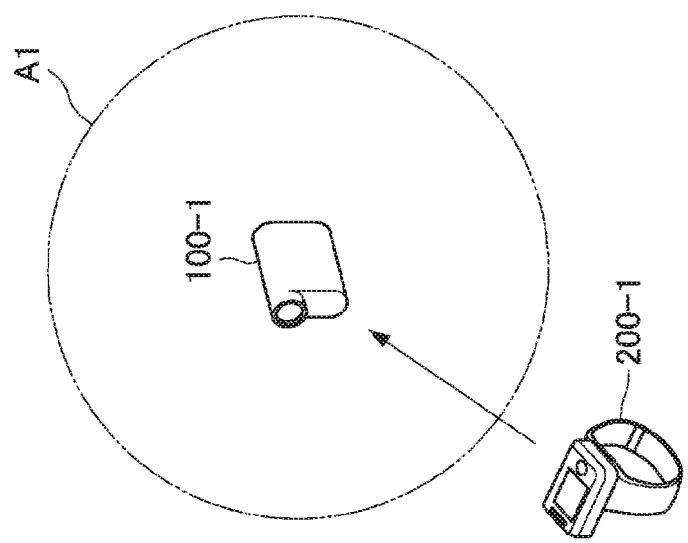

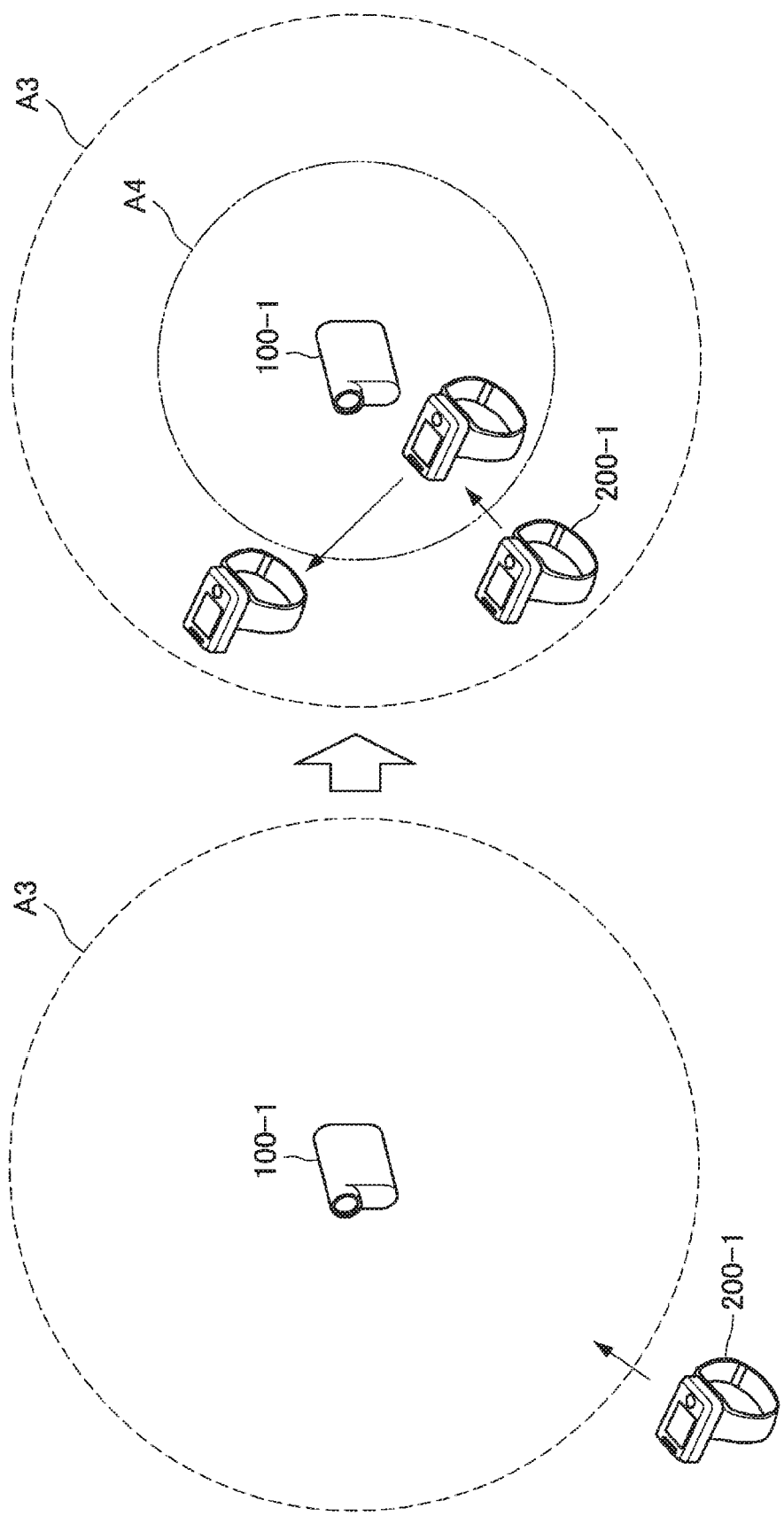

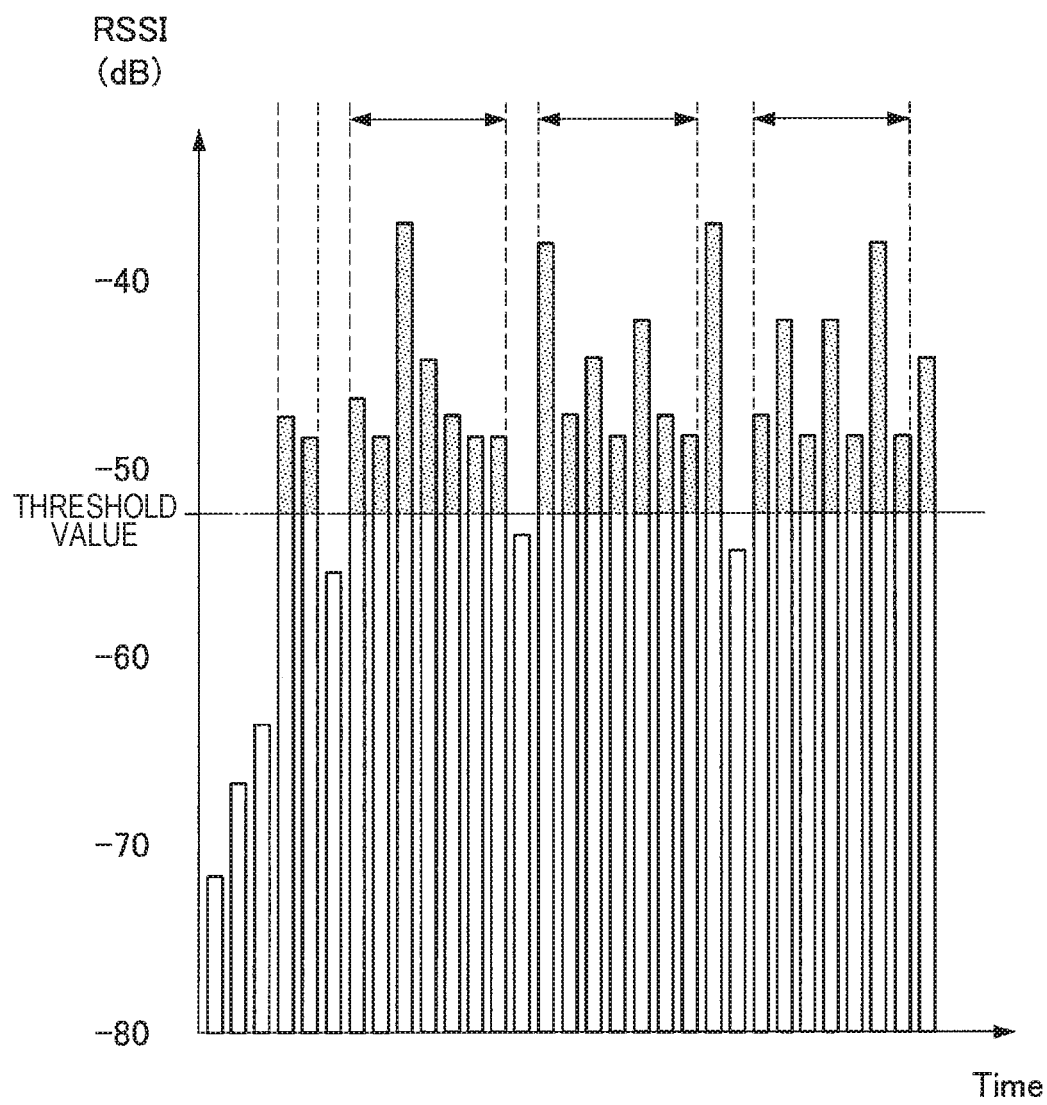

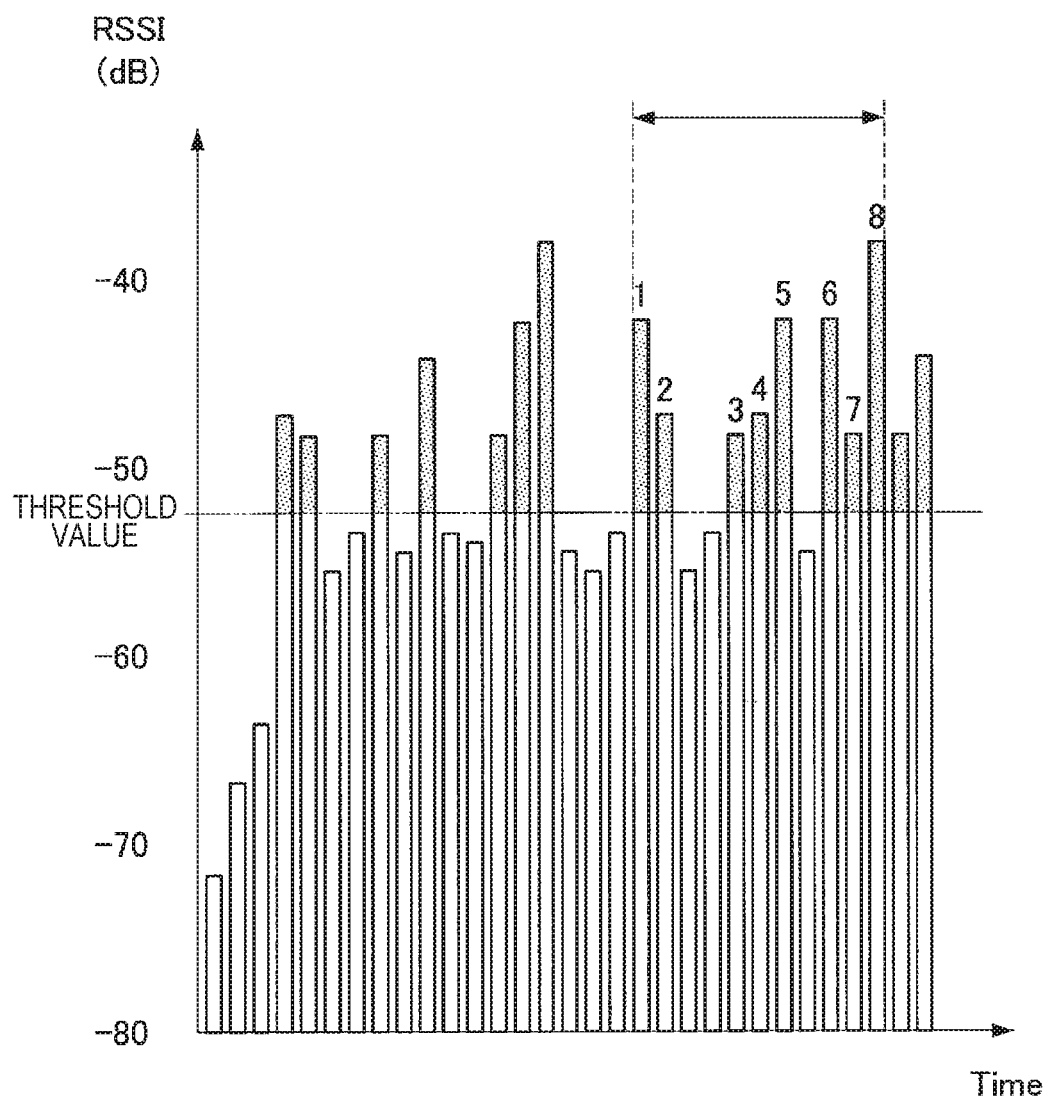

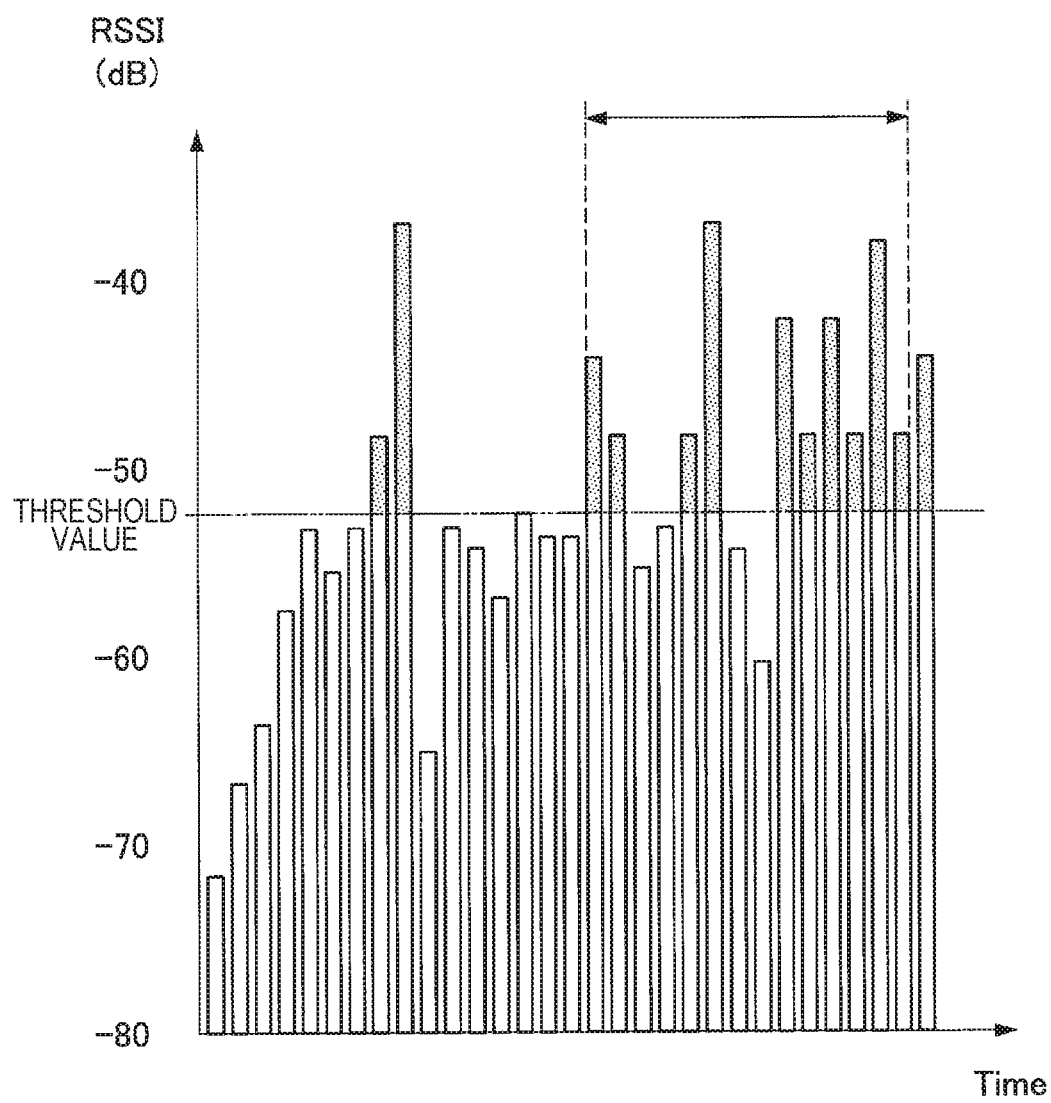

FIG. 10A

| IMAGING MODE | THRESHOLD VALUE |
|---|---|
| MOVING IMAGE | −60(dB) |
| CONTINUOUS STILL IMAGE CAPTURING | −50(dB) |
| STILL IMAGE | −40(dB) |

FIG. 10B

| IMAGING TARGET | THRESHOLD VALUE |
|---|---|
| BICYCLE | −60(dB) |
| TENNIS | −50(dB) |
| RUNNING | −40(dB) |

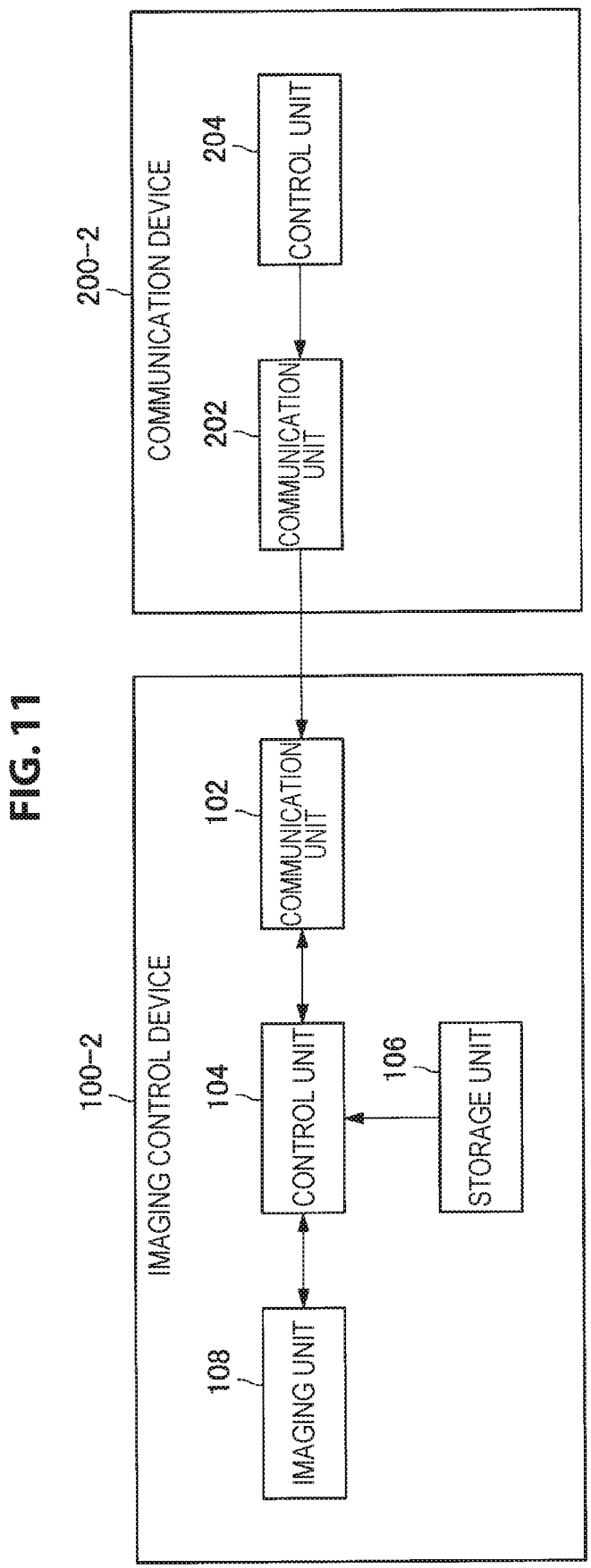

FIG. 16
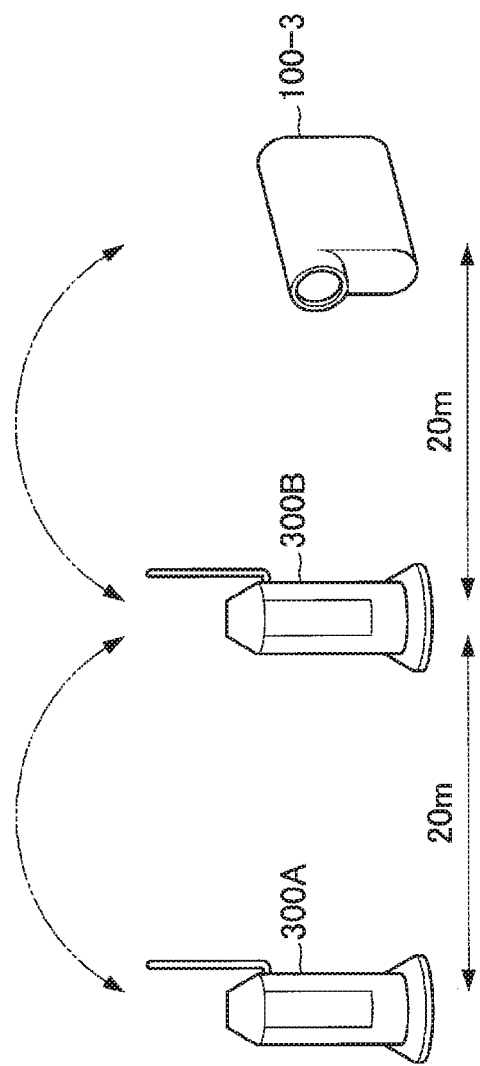
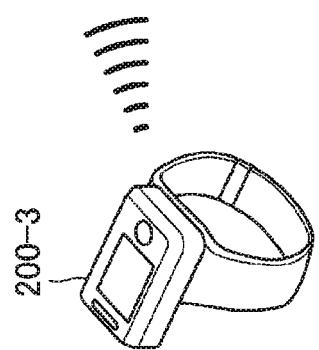

FIG. 22

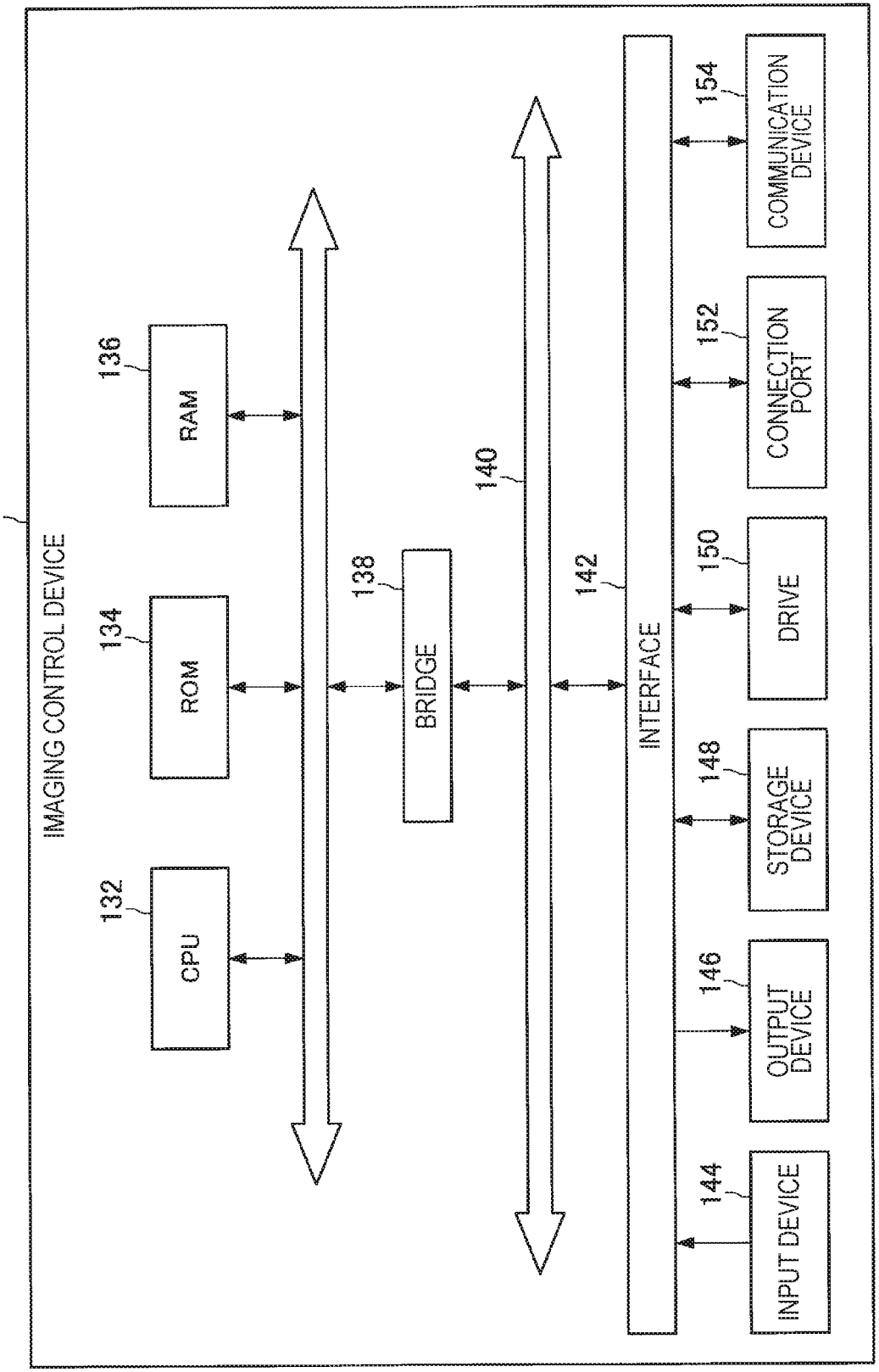

IMAGING CONTROL DEVICE, IMAGING CONTROL METHOD, AND IMAGING CONTROL SYSTEM WITH MOVING IMAGE PROCESSING THAT ADAPTS TO RECEIVED RADIO WAVE STRENGTH

TECHNICAL FIELD

The present disclosure relates to an imaging control device, an imaging control method, and an imaging control system.

BACKGROUND ART

In recent years, technology associated with an imaging device to which communication technology is applied and an imaging system that uses the imaging device has been developed. Among this technology, there is technology that captures an image on the basis of information obtained via communication.

For example, Patent Literature 1 discloses an invention associated with an imaging system that includes a broad area sensor that detects a user on the basis of a signal received from a wireless tag carried by the user, a communication device that performs communication with the wireless tag, and an imaging device that captures an image. The imaging system causes the imaging device to prepare for imaging when the broad area sensor detects the user, and thereafter causes the imaging device to capture an image When the communication device receives a signal from the wireless tag.

CITATION LIST

Patent Literature

Patent Literature 1: JP 2004-289433A

DISCLOSURE OF INVENTION

Technical Problem

However, in the invention disclosed in Patent Literature 1, a plurality of devices such as the broad area sensor and the communication device are used to decide an imaging timing, and thus the configuration is large and costs a lot.

Thus, the present disclosure proposes a new and improved imaging control device, an imaging control method, and an imaging control system, which can capture an image at a proper timing, while suppressing increase of the cost.

Solution to Problem

According to the present disclosure, there is provided an imaging control device including: an acquisition unit that acquires radio wave strength information indicating strength of a received radio wave; and a control unit that performs imaging control on the basis of a change of the radio wave strength information acquired by the acquisition unit.

In addition, according to the present disclosure, there is provided an imaging control method including: acquiring, by an acquisition unit, radio wave strength information indicating a strength of a received radio wave; and performing imaging control on the basis of a change of the radio wave strength information acquired by the acquisition unit.

In addition, according to the present disclosure, there is provided an imaging control system including: a communication device that includes a communication unit that transmits a radio wave; and an imaging control device that includes an acquisition unit that acquires radio wave strength information indicating a strength of the radio wave received from the communication unit of the communication device, and a control unit that performs imaging control on the basis of a change of the radio wave strength information acquired by the acquisition unit.

Advantageous Effects of Invention

As described above, the present disclosure provides the imaging control device, the imaging control method, and the imaging control system which can capture an image at a proper timing, while suppressing the increase of the cost. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram for describing an imaging control process of an imaging control device according to this embodiment.

FIG. 6 is a diagram for describing an imaging setting process of an imaging control device according to a first exemplary variant of this embodiment.

FIG. 7 is a diagram for describing a pattern of threshold value reaching determination for a measurement mode of a received signal strength in an imaging control device according to a third exemplary variant of this embodiment.

FIG. 8 is a diagram for describing a pattern of threshold value reaching determination for a measurement mode of a received signal strength in an imaging control device according to a third exemplary variant of this embodiment.

FIG. 9 is a diagram for describing a pattern of threshold value reaching determination for a measurement mode of a received signal strength in an imaging control device according to a third exemplary variant of this embodiment.

FIG. 10A is a diagram for describing a setting process of a threshold value of a received signal strength based on user operation of an imaging control device according to a fourth exemplary variant of this embodiment.

FIG. 10B is a diagram for describing a setting process of a threshold value of a received signal strength based on user operation of an imaging control device according to a fourth exemplary variant of this embodiment.

FIG. 11 is a block diagram illustrating a schematic functional configuration of an imaging control device and a communication device according to a second embodiment of the present disclosure.

FIG. 16 is a diagram illustrating a schematic physical configuration of an imaging control device, a repeater, and a communication device according to a third embodiment of the present disclosure.

FIG. 22 is a diagram for describing a user report process of a communication device according to an exemplary variant of this embodiment.

FIG. 23 is an explanatory diagram that illustrates a hardware configuration of an imaging control device according to an embodiment of the present disclosure.

MODE(S) FOR CARRYING OUT THE INVENTION

Figure 1:
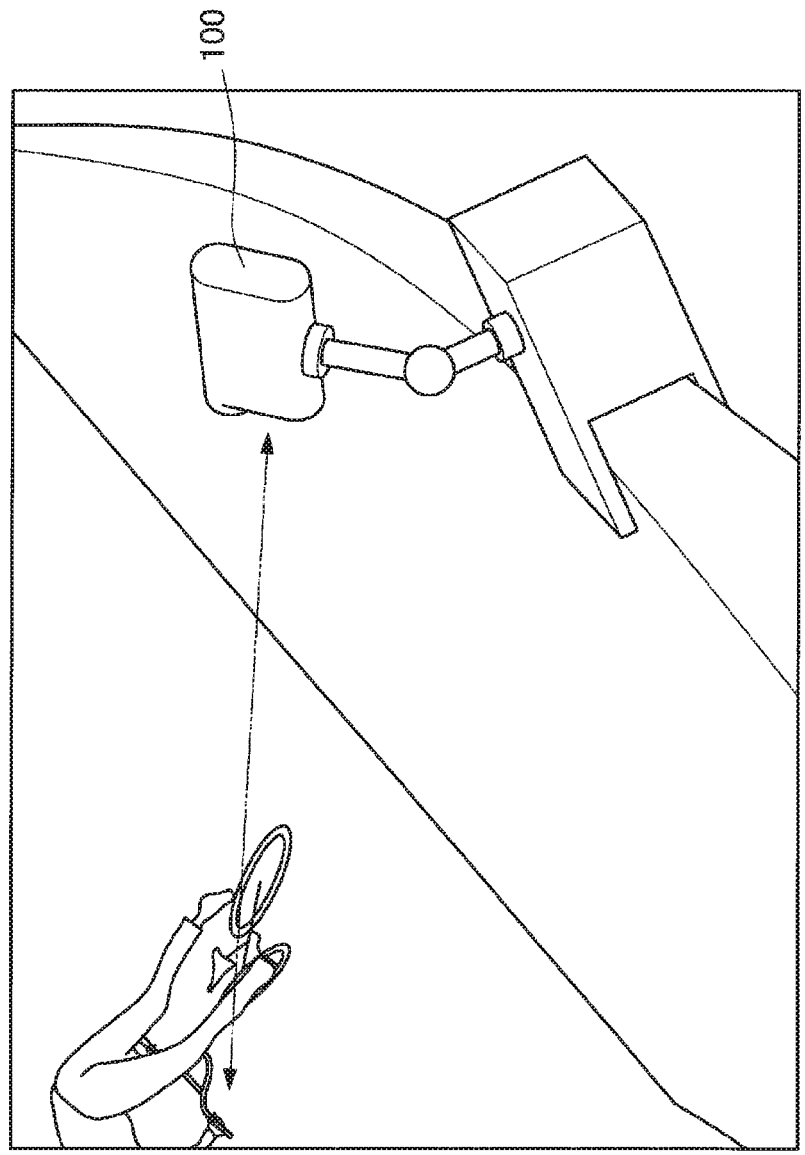
FIG. 1 is a diagram for describing an overview of an imaging control device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Overview of Imaging Control Device According to Embodiment of Present Disclosure
2. First Embodiment (Example in Which Imaging Control Device and Communication Device are One to One)
3. Second Embodiment (Example in Which Imaging Control Device and Communication Device are One to Many)
4. Third Embodiment (Example in Which Repeater is Provided Between Imaging Control Device and Communication Device)
5. Fourth Embodiment (Example in Which User Report Function is Provided)
6. Hardware Configuration of Imaging Control Device According to Embodiment of Present Disclosure
7. Conclusion <1. Overview of Imaging Control Device According to Embodiment of Present Disclosure>

First, with reference to FIG. 1, an overview of an imaging control device according to an embodiment of the present disclosure will be described. FIG. 1 is a diagram for describing the overview of the imaging control device according to an embodiment of the present disclosure.

An imaging control device 100 has an imaging function and a communication function. An image of an imaging subject around the imaging control device 100 is captured by using the imaging function. Also, radio waves is received from a communication device outside the imaging control device 100 by using the communication function. Hence, the imaging control device 100 can capture an image on the basis of the radio wave reception from the external communication device.

For example, the imaging control device 100 is attached to a side of a half pipe or the like in which a bicycle or the like runs as illustrated in FIG. 1, and performs communication with a wireless communication terminal (not illustrated in the drawings) carried by a user who rides on the bicycle or the like. Then, the imaging control device 100 performs imaging control, such as a start of imaging, on the basis of information obtained from the wireless communication terminal through communication, for example an imaging start instruction or the like of the user.

Here, in general, a plurality of devices are used to decide an imaging timing in the imaging control of the past that is based on the information obtained through the communication. For example, there are provided a device that detects an imaging subject that gets close to an imaging area of an imaging device and a device that detects that the imaging subject has entered the imaging area, and the imaging device starts preparing for imaging when the former device detects the imaging subject, and the imaging device captures an image when the latter device detects the imaging subject. Hence, a configuration for the imaging control is large, and the configuration costs a lot. Also, for the same reason, a control target is still image capturing, which is generally performed with a small number of devices for detection of the imaging subject in the imaging control of the past, and it has been difficult to employ continuous imaging operation, such as moving image capturing, as the control target.

Thus, the imaging control device 100 according to an embodiment of the present disclosure acquires radio wave strength information indicating the strength of a received radio wave, and performs imaging control on the basis of a change of the acquired radio wave strength information. For example, the imaging control device 100 prepares for the imaging when the strength of the radio wave received from the wireless communication terminal carried by the user as illustrated in FIG. 1 reaches a first threshold value, and captures an image when the strength of the radio wave reaches a second threshold value which is higher than the first threshold value.

Hence, in one imaging control device 100, the imaging control is performed on the basis of the strength of the received radio wave that corresponds to the distance to a communication partner, and thereby the imaging can be performed at a proper timing, while suppressing the increase of the cost. Note that the above describes an example in which the imaging control device 100 is installed at the side of the half pipe, but the installation of the imaging control device 100 may be another form. For example, the imaging control device 100 may be installed in a snowboard, a surfboard, or a motorcycle. Also, for convenience of explanation, the imaging control device 100 and the like according to the first to fourth embodiments are distinguished by suffixing the numbers corresponding to the embodiments at their last, like an imaging control device 100-1 to an imaging control device 100-4.

2. First Embodiment (Example in Which Imaging Control Device and Communication Device are One to One)

In the above, the overview of the imaging control device 100 according to an embodiment of the present disclosure has been described. Next, the imaging control device 100-1 according to a first embodiment of the present disclosure will be described.

2-1. Configuration of Device

Figure 2:
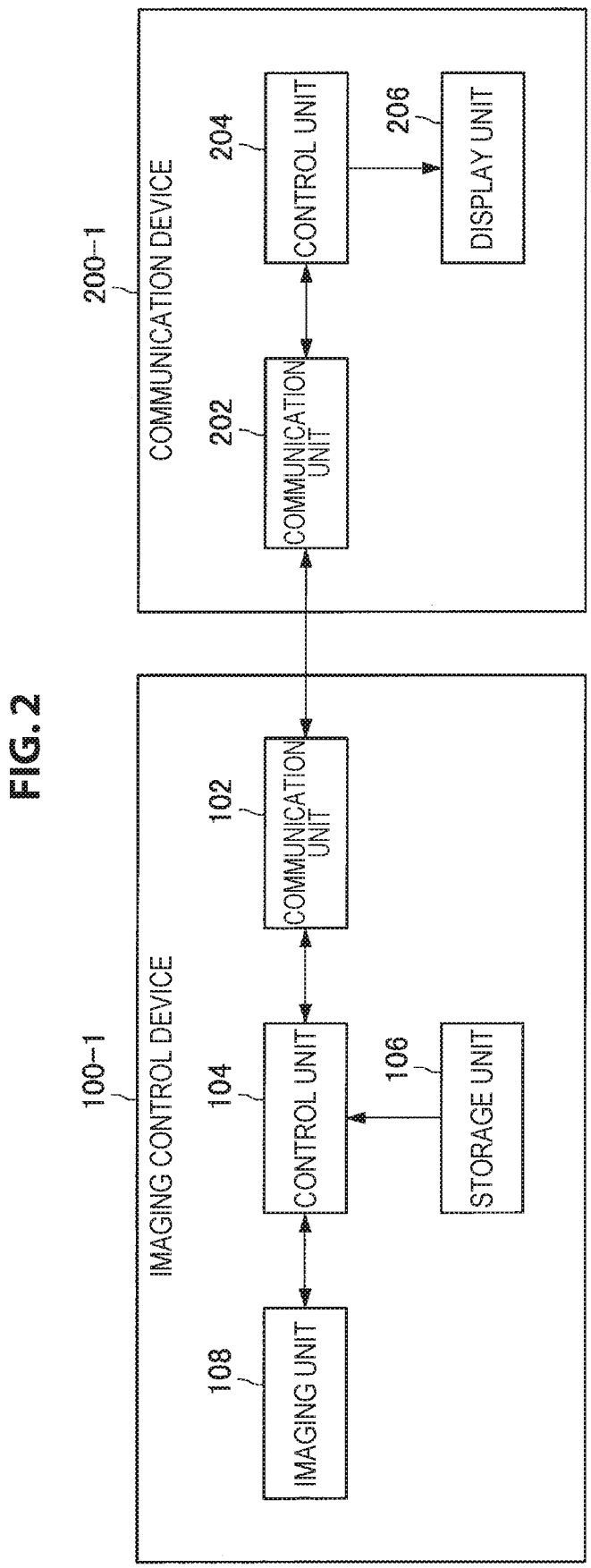
FIG. 2 is a block diagram illustrating a schematic functional configuration of an imaging control device and a communication device according to a first embodiment of the present disclosure.

First, with reference to FIG. 2, a functional configuration of an imaging control device 100-1 and a communication device 200-1 according to the first embodiment of the present disclosure will be described. FIG. 2 is a block diagram illustrating a schematic functional configuration of the imaging control device 100-1 and the communication device 200-1 according to the first embodiment of the present disclosure.

(Configuration of Imaging Control Device)

The imaging control device 100-1 includes a communication unit 102, a control unit 104, a storage unit 106, and an imaging unit 108, as illustrated in FIG. 2.

The communication unit 102 performs communication with the communication device 200-1. Specifically, the communication unit 102 receives an operation instruction or the like to the imaging control device 100-1 from the communication device 200-1, and transmits an image obtained by imaging to the communication device 200-1. For example, the communication unit 102 performs wireless communication by using a communication scheme such as Bluetooth (registered trademark) or Wi-Fi (registered trademark).

Also, the communication unit 102 acquires the strength of the received radio wave, as an acquisition unit. Specifically, when the radio wave is received from the communication device 200-1, the communication unit 102 generates information (hereinafter, also referred to as radio wave strength information) indicating the strength of the radio wave (hereinafter, also referred to as received signal strength). Note that the communication unit 102 may generate the radio wave strength information only for a part of the received radio wave. Also, when the radio wave is not received, the communication unit 102 may generate the radio wave strength information in which the strength of the radio wave indicates zero.

Figure 3:
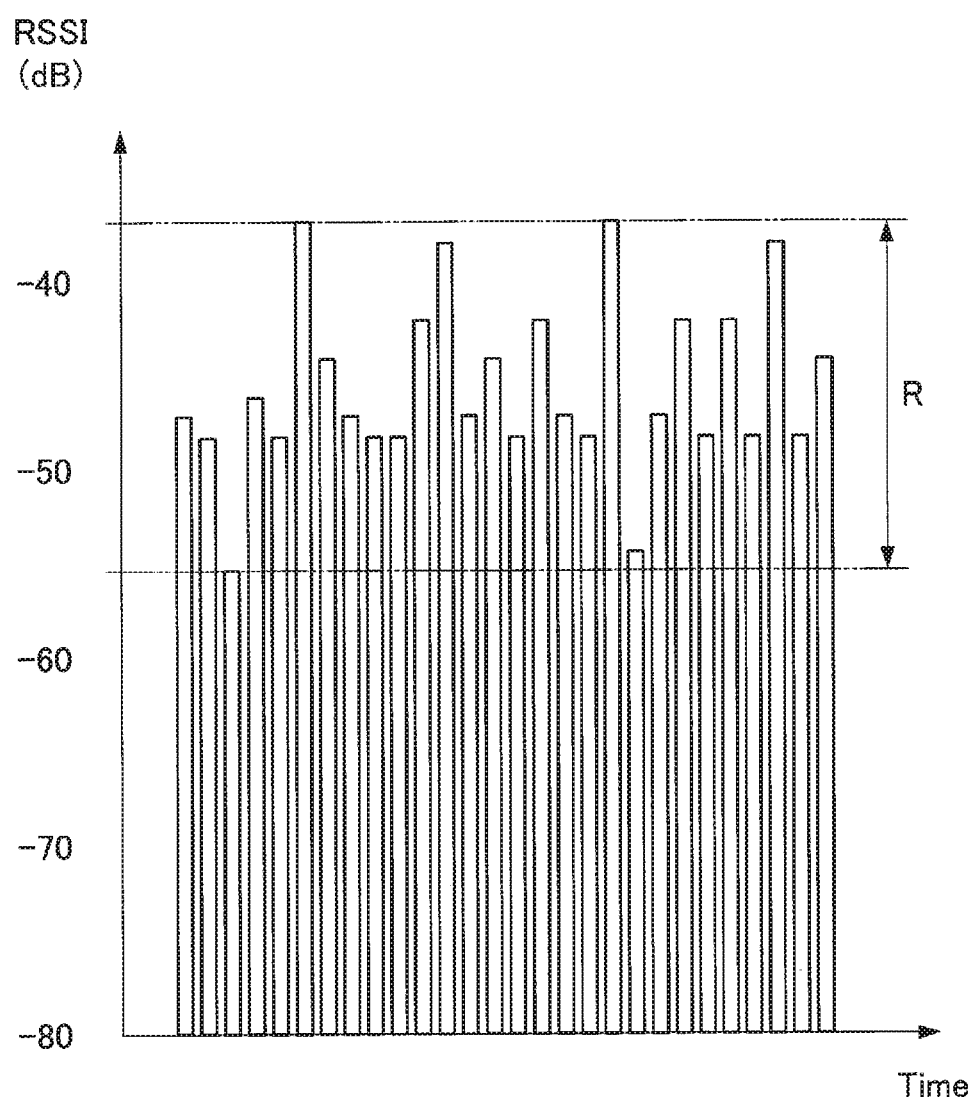
FIG. 3 is a graph illustrating an example of a typical change in time series of a received signal strength.

The control unit 104 controls the operation of the imaging control device 100-1 overall. Specifically, the control unit 104 controls the operation of the communication unit 102 and the imaging unit 108. More specifically, the control unit 104 performs the imaging control on the basis of the change of the radio wave strength information generated by the communication unit 102. For example, the control unit 104 performs the imaging control on the basis of the change of the radio wave strength information with regard to a threshold value of the received signal strength. Further, the imaging control process of the control unit 104 will be described in detail, with reference to FIGS. 3 and 4. FIG. 3 is a graph illustrating an example of a typical change in time series of the received signal strength, and FIG. 4 is a diagram for describing the imaging control process of the imaging control device 100-1 according to the present embodiment.

First, the control unit 104 performs the imaging control that corresponds to the threshold value, when the value indicated by the radio wave strength information generated by the communication unit 102 reaches the threshold value. For example, the control unit 104 can cause the imaging unit 108 to capture a still image, when the received signal strength changes from less than −50 dB to −50 dB or more. Note that the control unit 104 may perform different imaging controls between the change to exceed threshold value and the change to become lower than the threshold value.

Further, a plurality of threshold values of the received signal strength are provided, and the control unit 104 performs the imaging control that corresponds to each of the threshold values, when the received signal strength indicated by the radio wave strength information reaches each of the plurality of threshold values. For example, the control unit 104 can turn on a power supply of the imaging unit 108 when the received signal strength reaches the first threshold value, and cause the imaging unit 108 to capture a still image when the received signal strength reaches the second threshold value which is higher than the first threshold value.

Here, the strength of the received radio wave does not have a constant value even when communication distances are the same, and changes within a certain range in most cases. For example, the received signal strength indication (RSSI) in the wireless communication such as Bluetooth can change within a range of a width R illustrated in FIG. 3 at each time. Hence, for example, when a specific value such as −50 dB is fixedly set as the threshold value, the value of the received signal strength changes below and above the threshold value, and thereby the imaging control performed below and above the threshold value is repeated alternatingly and finely, like chattering. As a result, an image that is not intended by the user is captured.

Thus, in the imaging control device 100-1 according to the present embodiment, the control unit 104 sets a threshold value which is selected from a plurality of threshold values, and when the received signal strength reaches the set threshold value, changes the set threshold value to another threshold value.

Specifically, the control unit 104 first sets the first threshold value corresponding to a state of initial imaging control. For example, the control unit 104 sets the first threshold value corresponding to a power supply ON state and a moving image recording state of the imaging unit 108. The region around the imaging control device 100-1 whose received signal strength is equal to or greater than the strength of the first threshold value (hereinafter, also referred to as a region corresponding to the threshold value) can be a region A1 illustrated in the left diagram of FIG. 4.

Next, when the strength of the radio wave received from the communication device 200-1 reaches the first threshold value, the control unit 104 performs the imaging control that corresponds to the first threshold value and changes the threshold value of the received signal strength to the second threshold value. For example, when the communication device 200-1 enters the region A1 as illustrated in the left diagram of FIG. 4, the strength of the radio wave received from the communication device 200-1 reaches the first threshold value. Then, when the received signal strength reaches the first threshold value, the control unit 104 turns on the power supply of the imaging unit 108 and issues a record start instruction of the moving image, for example. Also, the control unit 104 changes the threshold value of the received signal strength to the second threshold value corresponding to the moving image non-recording state and the power supply OFF state, which is lower than the first threshold value. The region corresponding to the second threshold value can be a region A2 which is wider than the region A1, as illustrated in the right diagram of FIG. 4.

Thereafter, when the strength of the radio wave received from the communication device 200-1 reaches the second threshold value, the control unit 104 performs the imaging control that corresponds to the second threshold value, and returns the threshold value of the received signal strength to the first threshold value. For example, while the communication device 200-1 is moving inside the region A2 as illustrated in the right diagram of FIG. 4, the state of the imaging control is not changed, and the threshold value is not changed from the second threshold value, even if the communication device 200-1 moves to the outside of the region A1. However, when the communication device 200-1 moves to the outside of the region A2, that is, the received signal strength becomes lower than the second threshold value, the control unit 104 issues a moving image recording stop instruction and turns off the power supply of the imaging unit 108. Also, the control unit 104 changes the threshold value of the received signal strength to the first threshold value.

Note that the above description has described an example in which the second threshold value is lower than the first threshold value, but the second threshold value may be set higher than the first threshold value. For example, the second threshold value may be set such that the region A2 becomes narrower than the region A1, and when the communication device 200-1 gets closer to the imaging control device 100-1 than the region A1, another imaging control may be performed.

Also, the above description has described an example in which two threshold values and imaging controls are provided, but threshold values and imaging controls may be set more finely. For example, the first to fourth threshold values are provided, and when the received signal strength reaches the first threshold value, the power supply of the imaging unit 108 is turned on, and when the received signal strength reaches the second threshold value, the imaging of the moving image or the like is started. Then, when the received signal strength reaches the third threshold value, the imaging of the moving image or the like is ended, and when the received signal strength reaches the fourth threshold value, the power supply of the imaging unit 108 is turned off.

The storage unit 106 stores the information associated with the operation of the control unit 104. Specifically, the storage unit 106 stores the threshold values of the received signal strength, the information obtained by the communication of the communication unit 102, the image obtained by the imaging of the imaging unit 108, etc. For example, the threshold value of the received signal strength is stored in the storage unit 106 in association with the state of the imaging control.

The imaging unit 108 captures an image surrounding the imaging control device 100-1. Specifically, the imaging unit 108 performs the moving image capturing, the still image capturing, the continuous image capturing of the still image (hereinafter, also referred to as continuous still image capturing), and the like, on the basis of the instruction from the control unit 104 and the imaging mode. For example, the imaging unit 108 can include an imaging optical system, such as an imaging lens and a zoom lens, which collects a light, and a signal conversion element such as a charge coupled device (CCD) or a complementary metal oxide semiconductor (CMOS).

(Configuration of Communication Device)

Also, the communication device 200-1 includes a communication unit 202, a control unit 204, and a display unit 206, as illustrated in FIG. 2.

The communication unit 202 communicates with the imaging control device 100-1. Specifically, the communication unit 202 transmits the information supplied from the control unit 204 to the imaging control device 100-1, and receives information from the imaging control device 100-1. For example, the communication unit 202 transmits an operation request for the imaging control device 100-1 to the imaging control device 100-1, and receives the image obtained by the imaging from the imaging control device 100-1.

The control unit 204 controls the operation of the communication device 200-1 overall. Specifically, the control unit 204 controls the operation of the communication unit 202 and the display unit 206. For example, the control unit 204 instructs the period of radio wave transmission, the transmission content, and the like to the communication unit 202, and causes the display unit 206 to display the image received by the communication unit 202. Also, the control unit 204 generates and edits the image to be displayed on the display unit 206.

The display unit 206 displays the image. Specifically, the display unit 206 displays the image supplied from the control unit 204. For example, the display unit 206 can be a display device, such as a liquid crystal panel or an organic electro luminescence (EL).

<2-2. Process of Device>

Figure 5:
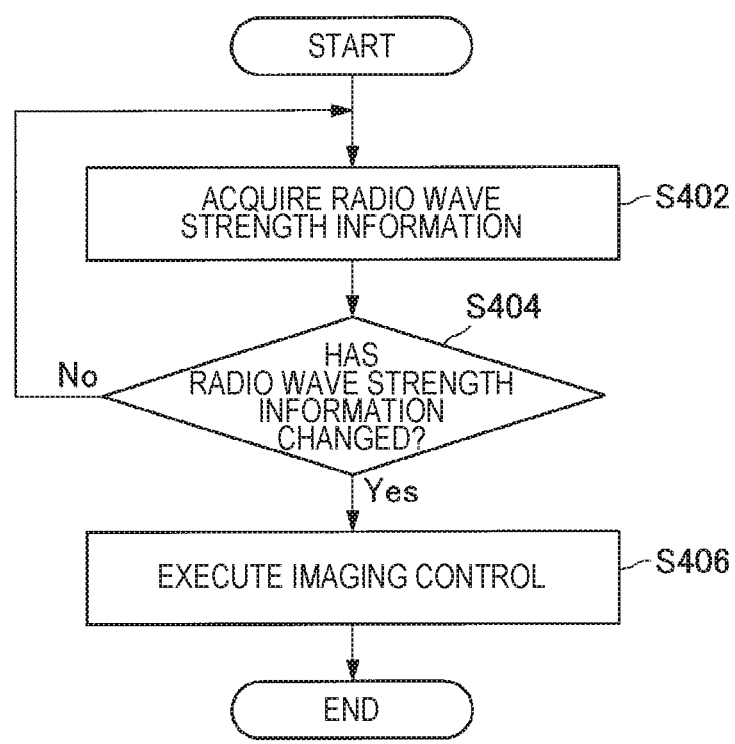
FIG. 5 is a flowchart conceptually illustrating a process of an imaging control device according to this embodiment.

Next, with reference to FIG. 5, the process of the imaging control device 100-1 according to the present embodiment will be described. FIG. 5 is a flowchart conceptually illustrating the process of the imaging control device 100-1 according to the present embodiment.

First, the imaging control device 100-1 acquires the radio wave strength information (step S402). Specifically, when the radio wave is received from the communication device 200-1, the communication unit 102 generates the radio wave strength information indicating the reception strength of the radio wave.

Next, the imaging control device 100-1 determines whether the radio wave strength information has changed (step S404). Specifically, when the radio wave strength information is generated by the communication unit 102, the control unit 104 determines whether the value indicated by the radio wave strength information has reached the set threshold value of the received signal strength.

If it is determined that the radio wave strength information has changed, the imaging control device 100-1 executes the imaging control (step S406). Specifically, if it is determined that the value indicated by the radio wave strength information has reached the set threshold value of the received signal strength, the control unit 104 performs the imaging control that corresponds to the threshold value, and thereafter changes the set threshold value to another threshold value.

As described above, according to the first embodiment of the present disclosure, the imaging control device 100-1 acquires the radio wave strength information indicating the strength of the received radio wave, and performs the imaging control on the basis of the change of the acquired radio wave strength information. Hence, in one imaging control device 100, the imaging control is performed on the basis of the strength of the received radio wave that corresponds to the distance to a communication partner, and thereby the imaging can be performed at a proper timing, while suppressing the increase of the cost.

Also, the imaging control device 100-1 performs the imaging control on the basis of the change of the radio wave strength information with regard to the threshold value of the strength of the radio wave. Hence, the imaging control is performed in accordance with the threshold value, and therefore the accuracy of the imaging timing can be further improved by the adjustment of the threshold value.

Also, there are provided a plurality of the above threshold values, and the imaging control device 100-1 performs the imaging control that corresponds to each of the threshold values when the strength of the radio wave indicated by the radio wave strength information reaches each of the threshold values. Hence, the imaging control is performed in a step-by-step manner to perform a complicated imaging control, satisfying various user needs.

Also, the imaging control device 100-1 sets a threshold value selected from a plurality of threshold values, and when the received signal strength reaches the set threshold value, changes the set threshold value to another threshold value. Hence, the threshold value changes in accordance with the state of the imaging control, and thereby the state of the imaging control is prevented from being switched like chattering, and an image that is not intended by the user is prevented from being captured.

Also, the imaging control includes a start and an end of the imaging in the continuous imaging operation. Then, the imaging control device 100-1 instructs the start of the imaging when the strength of the radio wave indicated by the radio wave strength information reaches the first threshold value, and thereafter instructs the end of the imaging when the strength of the radio wave indicated by the radio wave strength information reaches the second threshold value. Hence, the imaging control of the moving image or the like is performed without providing a plurality of devices, and thereby the increase of the configuration is prevented, and the user can light-heartedly perform the image capturing of the moving image or the like, and the convenience is improved.

<2-3. Exemplary Variant>

In the above, the first embodiment of the present disclosure has been described. Note that the present embodiment is not limited to the above example. In the following, first to fourth exemplary variants of the present embodiment will be described.

(First Exemplary Variant)

As the first exemplary variant of the present embodiment, the imaging control device 100-1 may perform setting associated with the imaging (hereinafter, also referred to as imaging setting) as the imaging control. Specifically, the control unit 104 performs the setting associated with the imaging which corresponds to the threshold value, when the received signal strength reaches the threshold value. Further, with reference to FIG. 6, the process of the present exemplary variant will be described in detail. FIG. 6 is a diagram for describing an imaging setting process of the imaging control device 100-1 according to the first exemplary variant of the present embodiment.

First, the control unit 104 sets the first threshold value corresponding to an initial imaging control state. For example, the region corresponding to the first threshold value can be a region A3 illustrated in the left diagram of FIG. 6.

Next, when the strength of the radio wave received from the communication device 200-1 reaches the first threshold value, the control unit 104 performs the imaging setting that corresponds to the first threshold value, and additionally sets the second threshold value. For example, when the communication device 200-1 enters the region A3 as illustrated in FIG. 6, the control unit 104 turns on the power supply of the imaging unit 108 and issues the imaging start instruction of the moving image or the like, and performs the initial setting of the frame rate, for example. Also, the control unit 104 additionally sets the threshold value of the received signal strength to the second threshold value which is higher than the first threshold value and corresponds to a frame rate that is higher than the frame rate of the initial setting. For example, the region corresponding to the second threshold value can be a region A4 that is narrower than the region A3, as illustrated in the right diagram of FIG. 6.

Next, the control unit 104 performs the imaging setting that corresponds to the second threshold value, when the strength of the radio wave received from the communication device 200-1 reaches the second threshold value. For example, when the communication device 200-1 enters the region A4 as illustrated in the right diagram of FIG. 6, the control unit 104 sets the frame rate to a frame rate that is higher than the frame rate of the initial setting.

Then, when the strength of the radio wave received from the communication device 200-1 becomes lower than the second threshold value, the control unit 104 performs the imaging setting corresponding to the first threshold value. For example, when the communication device 200-1 moves inside the region A3 and outside the region A4 as illustrated in the right diagram of FIG. 6, the control unit 104 sets the frame rate to the frame rate of the initial setting.

Note that, in addition to the setting of the frame rate described above, the imaging setting can be one of or a combination of various types of settings in the imaging, such as setting of sensitivity, diaphragm, or light exposure time, setting of view angle, zoom setting, and focus setting. Also, the imaging setting and the control of the imaging operation described in the first embodiment may be each performed independently. Although the above description has described an example in which the threshold value is set additionally, the threshold value may be changed in accordance with the imaging setting, similarly to the first embodiment.

As described above, according to the first exemplary variant of the present embodiment, when the received signal strength reaches a threshold value, the imaging control device 100-1 performs the setting associated with the imaging that corresponds to the threshold value. Hence, the imaging setting suitable for the distance to the communication device 200-1, that is, the imaging subject is performed to automatically capture an image that is preferable for the user.

(Second Exemplary Variant)

As the second exemplary variant of the present embodiment, the imaging control device 100-1 may leave a record in the imaging result, in response to approach of the communication device 200-1. Specifically, when the received signal strength reaches the threshold value, the control unit 104 attaches information to the image obtained by the imaging, during the continuous imaging operation.

For example, the control unit 104 causes the imaging unit 108 to continuously perform the moving image capturing, and each time the strength of the radio wave received from the communication device 200-1 reaches the threshold value, attaches a tag to the moving image obtained by the moving image capturing, as attachment of metadata of the moving image. In more detail, the control unit 104 attaches a start tag when the communication device 200-1 enters the region corresponding to a predetermined threshold value, that is, when the received signal strength reaches a predetermined threshold value, and attaches an end tag when the communication device 200-1 moves out of the region, that is, when the received signal strength becomes lower than the predetermined threshold value.

Note that the information attached as the tag can include attachment date and time, site, identification information of the communication device 200-1, etc. Also, there may be provided a plurality of the threshold values, and the control unit 104 may attach different tags for threshold values.

As described above, according to the second exemplary variant of the present embodiment, when the received signal strength reaches the threshold value, the control unit 104 attaches the information to the image obtained by the imaging operation, during the continuous imaging operation. Hence, the tag attachment associated with the communication device 200-1 is performed to the moving image or the like, and thereby it becomes easy to search for a situation related to the communication device 200-1 in the moving image or the like, improving the convenience of the user.

(Third Exemplary Variant)

As the third exemplary variant of the present embodiment, the imaging control device 100-1 may spend the time in threshold value reaching determination of the received signal strength. As described above, the received signal strength changes within a range of a certain width, even at the same communication distance. Thus, the imaging control device 100-1 according to the present exemplary variant determines whether or not the threshold value is reached by utilizing a plurality of received signal strengths. Specifically, the control unit 104 determines whether or not the threshold value is reached on the basis of a measurement mode of the strengths of the radio waves indicated by a plurality of pieces of radio wave strength information. Further, the process of the present exemplary variant will be described in detail, with reference to FIGS. 7 to 9. FIGS. 7 to 9 are each diagrams for describing patterns of the threshold value reaching determination with respect to the measurement mode of the received signal strength in the imaging control device 100-1 according to the third exemplary variant of the present embodiment.

First, with reference to FIG. 7, a pattern (hereinafter, also referred to as a first pattern) in which a period which has a predetermined length and during which the strength of the radio wave indicated by the radio wave strength information continues to exceed the threshold value occurs a predetermined number of times, in the measurement mode of the received signal strength, will be described. For example, during a period (hereinafter, also referred to as a block) in which the received signal strength is measured seven times as illustrated in FIG. 7, when a block in which the received signal strength becomes always higher than the threshold value occurs three times as indicated by double-headed arrows of FIG. 7, the control unit 104 determines that the threshold value is exceeded.

Next, with reference to FIG. 8, a pattern (hereinafter, also referred to as a second pattern) in which the strength of the radio wave indicated by the radio wave strength information exceeds the threshold value a predetermined number of times during a period of a predetermined length, in the measurement mode of the received signal strength, will be described. For example, the control unit 104 determines that the threshold value is exceeded, when the received signal strength that becomes higher than the threshold value occurs eight times during a period in which the received signal strength is measured 11 times as illustrated in FIG. 8.

Next, with reference to FIG. 9, a pattern (hereinafter, also referred to as a third pattern) in which the representative value of the strength of the radio wave indicated by the radio wave strength information has a value that exceeds the threshold value during the period of a predetermined length, in the measurement mode of the received signal strength, will be described. For example, when the average value of the received signal strength becomes higher than the threshold value during the period in which the received signal strength is measured 14 times as illustrated in FIG. 9, the control unit 104 determines that the threshold value is exceeded. Note that the above representative value may be a mode value or the like, as well as the average value.

Although the above description has described an example of the determination of exceeding the threshold value, determination of being smaller than the threshold value can be performed similarly. Also, the value of the number of times or the period in the above measurement mode is not limited to the above example, and various values can be set.

As described above, according to the third exemplary variant of the present embodiment, the imaging control device 100-1 determines whether or not the threshold value is reached, on the basis of the measurement mode of the strength of the radio wave indicated by a plurality of pieces of radio wave strength information. Hence, whether or not the threshold value is reached is determined on the basis of a plurality of received signal strengths, and thereby the state of the imaging control is prevented from being switched like chattering, and an image that is not intended by the user is prevented from being captured.

Also, the above measurement mode includes a predetermined number of occurrences of periods which have a predetermined length and in which the strength of the radio wave indicated by the radio wave strength information continues to exceed the threshold value. Hence, the condition associated with the determination of whether or not the threshold value is reached is severer than other patterns, and thus the accuracy of the determination can be improved more than the other patterns.

Also, the above measurement mode includes a predetermined number of times when the strength of the radio wave indicated by the radio wave strength information exceeds the threshold value during the period of a predetermined length. Hence, the condition associated with the determination of whether or not the threshold value is reached is simpler than the first pattern, and thus the time for the determination can be made shorter than the first pattern. For example, when the imaging control device 100-1 captures an image of an imaging subject, such as a traveling vehicle or a person playing sport, whose motion is faster than walking or the like, the present configuration is considered to work effectively.

Also, the above measurement mode includes the representative value of the strength of the radio wave indicated by the radio wave strength information during the period of a predetermined length, which is a value that exceeds the threshold value. Hence, the condition associated with the determination of whether or not the threshold value is reached is simpler than the first pattern, and the influence of contingency is reduced as compared with the second pattern, and thus a balance can be maintained between the accuracy of the determination and the determination time.

(Fourth Exemplary Variant)

As the fourth exemplary variant of the present embodiment, the threshold value of the received signal strength may be set by the user. Specifically, the imaging control device 100-1 includes an operation unit additionally, and the control unit 104 sets the threshold value of the received signal strength on the basis of the operation of the user to the operation unit. Further, the process of the present exemplary variant will be described in detail with reference to FIGS. 10A and 10B. Each of FIGS. 10A and 10B is a diagram for describing a setting process of the threshold value of the received signal strength based on the user operation of the imaging control device 100-1 according to the fourth exemplary variant of the present embodiment.

The control unit 104 sets the threshold value corresponding to the imaging content selected by the user. For example, the selection of the imaging content is selection of the imaging mode, such as the moving image, the still image, and the continuous still image capturing, and the control unit 104 sets the threshold value corresponding to the selected imaging mode illustrated in FIG. 10A to the threshold value of the received signal strength.

Also, the selection of the imaging content is selection of the imaging target (imaging scene) such as bicycle, tennis, and running, and the control unit 104 sets the threshold value corresponding to the selected imaging target illustrated in FIG. 10B to the threshold value of the received signal strength.

Further, the control unit 104 may set the threshold value of the received signal strength on the basis of a combination of a plurality of imaging contents. For example, the value corresponding to the imaging target is a coefficient, and the control unit 104 sets the threshold value corresponding to the selected imaging mode and the threshold value calculated from the coefficient corresponding to the selected imaging target to the threshold value of the received signal strength. Note that the value corresponding to the imaging mode may be a coefficient, and the value corresponding to the imaging target may be a threshold value. Also, the threshold values or the coefficients corresponding to the imaging mode and the imaging target are stored in the storage unit 106.

Although the above description has described an example in which the user operation is the selection of the imaging content, the user operation may be setting of a distance to the imaging subject. For example, the user operation can be selection of information of rough indication of the distance, such as near, normal, and far, indicating the distance to the imaging subject. Then, the control unit 104 acquires from the storage unit 106 the threshold value corresponding to the selected information of the rough indication of the distance to the imaging subject, and sets the acquired threshold value to the threshold value of the received signal strength. Also, the information indicating the distance to the imaging subject may be a specific length of distance, for example, a numerical value expressed in meters.

Although the above description has described an example in which the threshold value of the received signal strength is set on the basis of the user operation to the imaging control device 100-1, the threshold value may be set on the basis of the user operation to the communication device 200-1. For example, the information associated with the selection operation of the imaging content is transmitted from the communication device 200-1 on the basis of the selection operation of the above imaging content performed to the communication device 200-1. Then, the control unit 104 acquires the threshold value or the threshold value and the coefficient from the storage unit 106 on the basis of the received information, and calculates the threshold value of the received signal strength by using the acquired value. In this case, the communication device 200-1 can be a remote controller of the imaging control device 100-1, for example.

As described above, according to the fourth exemplary variant of the present embodiment, the threshold value of the received signal strength is set on the basis of the user operation. Hence, the image is captured at the threshold value, i.e., the imaging timing set by the user, and thereby the convenience of the user can be improved.

Also, the above user operation includes the selection of the imaging content, and the imaging control device 100-1 sets the threshold value corresponding to the selected imaging content. Hence, the threshold value of the received signal strength is indirectly set by the user operation, and thereby the operation becomes easier as compared with a case in which the setting of the threshold value is performed directly, and the convenience of the user can be improve further.

<3. Second Embodiment (Example in Which Imaging Control Device and Communication Device Are One to Many)>

In the above, the imaging control device 100-1 according to the first embodiment of the present disclosure has been described. Next, the imaging control device 100-2 according to a second embodiment of the present disclosure will be described. In the second embodiment, a plurality of communication devices 200-2 are provided.

<3-1. Configuration of Device>

First, with reference to FIG. 11, a functional configuration of an imaging control device 100-2 and a communication device 200-2 according to the second embodiment of the present disclosure will be described. FIG. 11 is a block diagram illustrating the schematic functional configuration of the imaging control device 100-2 and the communication device 200-2 according to the present embodiment. Note that the configuration of the imaging control device 100-2 according to the present embodiment is substantially same as the configuration according to the first embodiment, but the function of the control unit 104 differs partially. Hence, the imaging control device 100-2 will be described only with regard to the control unit 104. The description of the substantially same function as the first embodiment will be omitted.

(Configuration of Imaging Control Device)

Figure 12:
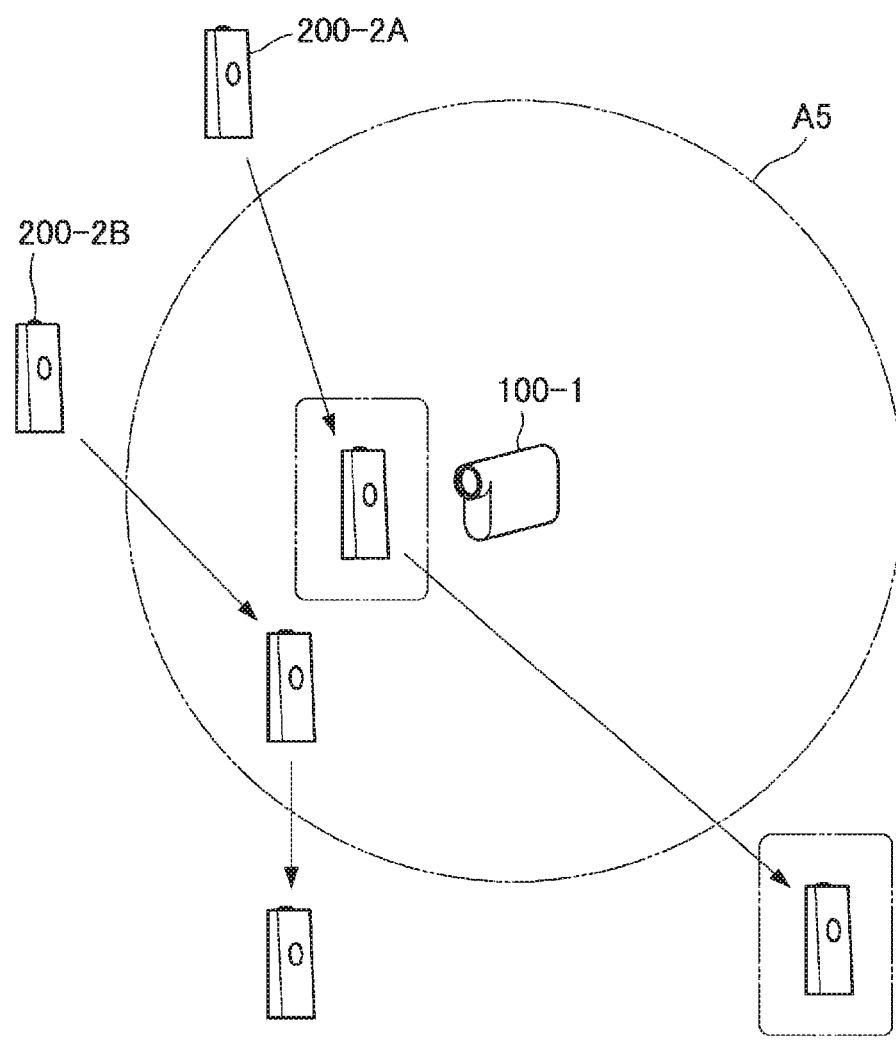
FIG. 12 is a diagram for describing an imaging control process for a plurality of communication devices in an imaging control device according to this embodiment.

When the radio waves are received from a plurality of communication devices 200-2, the control unit 104 performs the imaging control on the basis of the change, with regard to the threshold value, of the strength of the radio wave received from a specific communication device 200-2 among the plurality of communication devices 200-2. Specifically, the specific communication device 200-2 is a communication device 200-2 that transmits the radio wave that reaches the threshold value before the radio waves received from the other communication devices 200-2, and the control unit 104 performs the imaging control on the basis of the change, in relation to the threshold value, of the strength of the radio wave received from the specific communication device 200-2. Further, a process when receiving the radio waves from a plurality of communication devices 200-2 will be described with reference to FIG. 12. FIG. 12 is a diagram for describing the imaging control process, for a plurality of communication devices 200-2, in the imaging control device 100-2 according to the present embodiment.

First, the control unit 104 sets the threshold value that corresponds to a predetermined imaging control. For example, the control unit 104 sets the threshold value that corresponds to an imaging start of the moving image. Note that the region corresponding to the threshold value can be a region A5 illustrated in FIG. 12.

Next, when the radio wave that reaches the threshold value is received from the communication device 200-2, the control unit 104 performs the imaging control, and records the transmission source of the received radio wave. For example, when the communication device 200-2A enters the region A5 as illustrated in FIG. 12, and the radio wave of the strength that exceeds the threshold value is received from the communication device 200-2A, the control unit 104 performs the imaging control that corresponds to the threshold value, for example a record start instruction of the moving image. Also, the control unit 104 acquires the identification information indicating the communication device 200-2A included in the information sent by the radio wave, and stores the acquired identification information in the storage unit 106. Note that, when the radio wave that reaches the threshold value is received from another communication device 200-2B illustrated in FIG. 12 after the identification information is recorded, the control unit 104 does not perform the imaging control, and does not record the identification information of the other communication device 200-2. Also, the identification information can be information such as an individual identification number of the communication device 200-2 or an address in communication.

Next, the control unit 104 determines whether the strength of the radio wave received from the communication device 200-2 associated with the recorded identification information has changed with regard to the threshold value. For example, when the communication device 200-2A moves out of the region A5, and the strength of the radio wave received from the communication device 200-2A becomes lower than the threshold value, the control unit 104 issues a moving image recording stop instruction. Note that the control unit 104 does not perform the imaging control, even when the communication device 200-2B moves out of the region A5 before the communication device 200-2A, and the strength of the radio wave transmitted from the communication device 200-2B becomes lower than the threshold value.

(Configuration of Communication Device)

The communication device 200-2 includes only the communication unit 202 and the control unit 204, as illustrated in FIG. 11. For example, the communication device 200-2 can be a wireless communication device, such as a wireless IC (Integrated Circuit) tag.

The communication unit 202 transmits the radio wave periodically on the basis of an instruction of the control unit 204. Specifically, the communication unit 202 does not perform bidirectional communication with the imaging control device 100-2, and periodically transmits information including the identification information of the communication device 200-2. For example, the communication unit 202 transmits the radio wave periodically, like advertising in Bluetooth communication.

The control unit 204 instructs a transmission process to the communication unit 202. Specifically, the control unit 204 causes the communication unit 202 to periodically transmit the identification information of the communication device 200-2 stored in a storage unit that is additionally included in the communication device 200-2. Note that the control unit 204 may generate the identification information.

<3-2. Process of Device>

Figure 13:
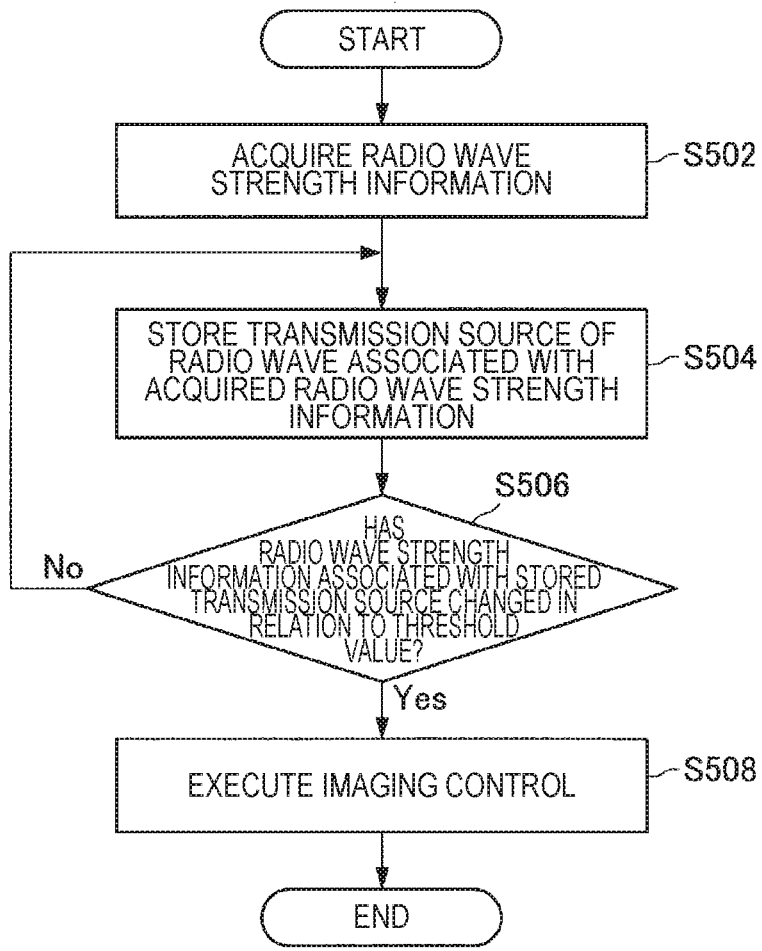
FIG. 13 is a flowchart conceptually illustrating a process of an imaging control device according to this embodiment.

Next, with reference to FIG. 13, the process of the imaging control device 100-2 according to the present embodiment will be described. FIG. 13 is a flowchart conceptually illustrating a process of the imaging control device 100-2 according to the present embodiment. Note that the description of the substantially same process as the process in the first embodiment will be omitted.

First, the imaging control device 100-2 acquires the radio wave strength information (step S502), and stores the transmission source of the radio wave associated with the acquired radio wave strength information (step S504). Specifically, when the communication unit 102 receives from the communication device 200-2 the radio wave on which the identification information is superposed, the control unit 104 stores the identification information in the storage unit 106.

Next, the imaging control device 100-2 determines whether the radio wave strength information associated with the stored transmission source has changed in relation to the threshold value (step S506). Specifically, when the identification information superposed on the radio wave is identical with the identification information stored in the storage unit 106 each time the radio wave is received by the communication unit 102, the control unit 104 determines whether the strength of the radio wave has reached the threshold value.

If it is determined that the radio wave strength information associated with the stored transmission source has changed, the imaging control device 100-2 executes the imaging control (step S508). Specifically, if it is determined that the received signal strength of the radio wave associated with the identification information stored in the storage unit 106 has reached the threshold value, the control unit 104 performs the imaging control that corresponds to the threshold value.

As described above, according to the second embodiment of the present disclosure, when the radio wave is received from a plurality of communication devices, the imaging control device 100-2 performs the imaging control on the basis of the change, with regard to the threshold value, of the strength of the radio wave received from a specific communication device 200-2 among the plurality of communication devices. Hence, the imaging control is performed only on the basis of the communication device 200-2 that the user wants it to be a target among a plurality of communication devices 200-2, and thereby a situation that can utilize the imaging control device 100-2 increases, improving the convenience.

Also, the above specific communication device 200-2 includes the communication device 200-2 that has transmitted the radio wave that has reached the threshold value before the radio wave received from other communication devices. Hence, the imaging control can be performed, with a focus on one communication device 200-2.

Note that the above specific communication device 200-2 may be a communication device 200-2 in which the identification information is registered in advance. In this case, the imaging can be performed with a focus on the communication device 200-2 for registration.

Also, the control unit 104 may change the operation on the basis of the information that changes in accordance with the number of communication devices 200-2 within the region corresponding to the threshold value. Specifically, the control unit 104 executes the imaging control in accordance with the number of communication devices 200-2 within the region corresponding to the threshold value. For example, the control unit 104 sets the imaging mode to the still image when the number of communication devices 200-2 within the region corresponding to the threshold value is smaller than a predetermined number, and sets the imaging mode to the moving image when the number of communication devices 200-2 is equal to or larger than the predetermined number. Note that the control unit 104 may execute the imaging control on the basis of the density of the communication devices 200-2 within the region corresponding to the threshold value. Also, the control unit 104 may change the state of the imaging control on the basis of the change of the number of communication devices 200-2 within the region corresponding to the threshold value. For example, when the number of communication devices 200-2 within the region corresponding to the threshold value changes from less than a predetermined number to the predetermined number or more, the control unit 104 switches the imaging mode from the still image to the moving image.

<3-3. Exemplary Variant>

In the above, the second embodiment of the present disclosure has been described. Note that the present embodiment is not limited to the above example. In the following, an exemplary variant of the present embodiment will be described.

Figure 14:
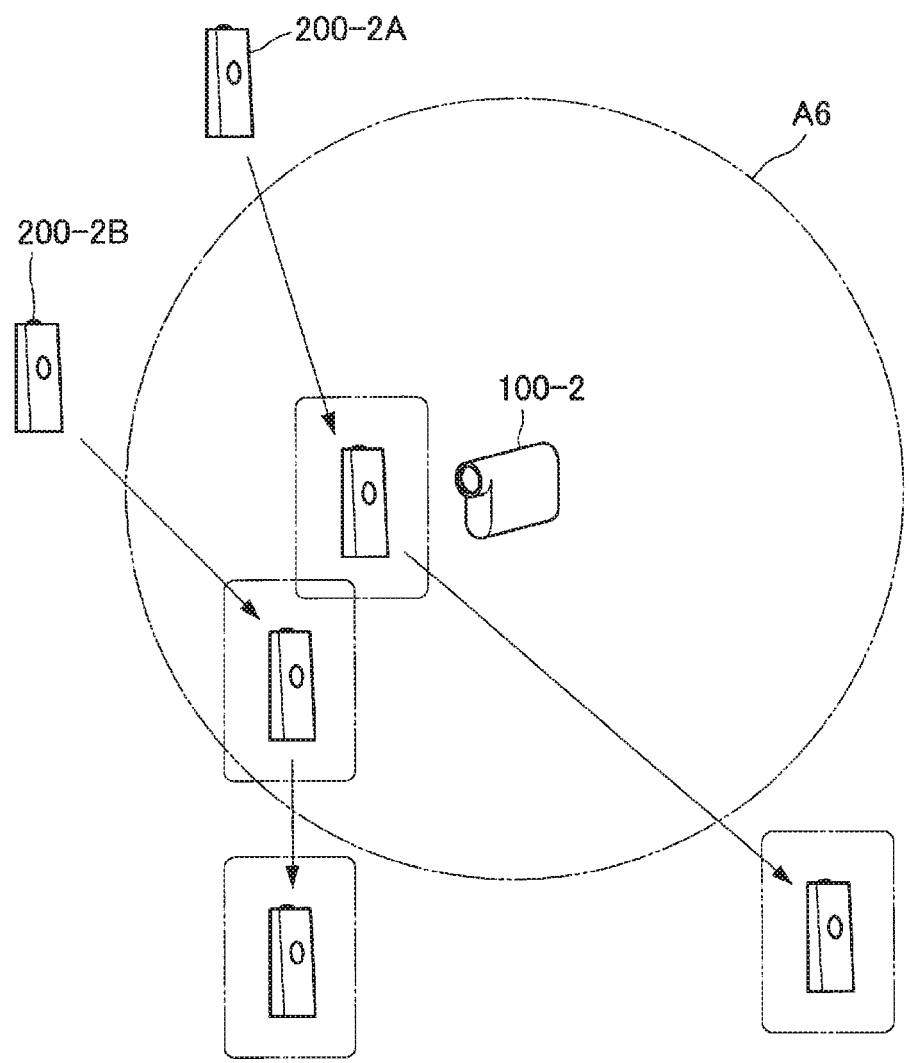
FIG. 14 is a diagram for describing an imaging control process for a plurality of communication devices in an imaging control device according to an exemplary variant of this embodiment.
Figure 15:
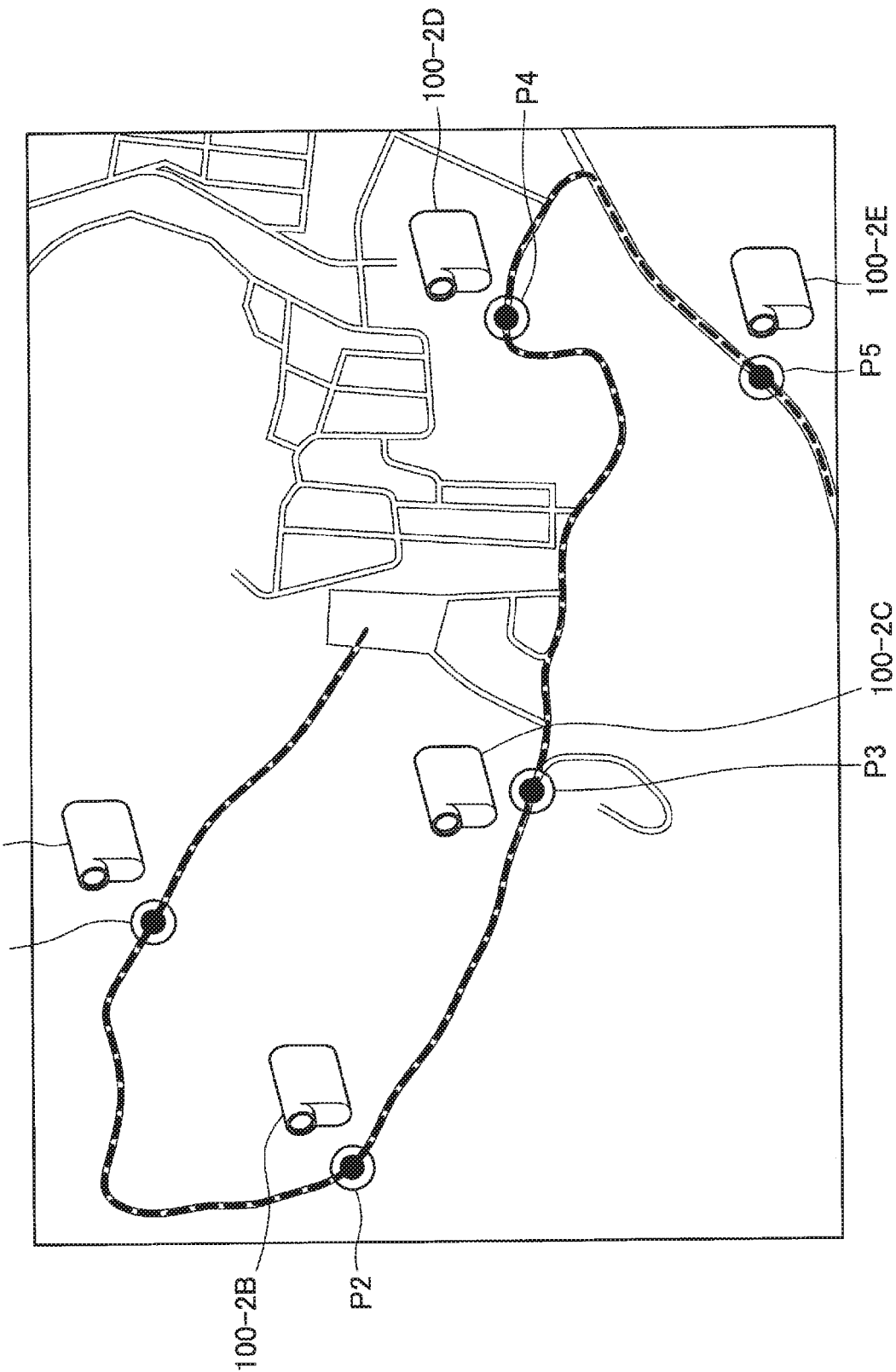
FIG. 15 is a diagram for describing exemplary application of an exemplary variant of this embodiment.

As the exemplary variant of the present embodiment, the imaging control device 100-2 may perform the imaging control, targeting all of the communication devices 200-2 that enter the region corresponding to the threshold value. Specifically, the control unit 104 performs the imaging control on the basis of the changes, with regard to the threshold value, of the strengths of the radio waves received from all communication devices 200-2 that have transmitted the radio waves that reach the threshold value, among a plurality of communication devices 200-2. Further, a process of the present exemplary variant will be described in detail, with reference to FIGS. 14 and 15. FIG. 14 is a diagram for describing the imaging control process to a plurality of communication devices 200-2 in the imaging control device 100-2 according to the exemplary variant of the present embodiment, and FIG. 15 is a diagram for describing exemplary application of the exemplary variant of the present embodiment.

First, the control unit 104 sets the threshold value that corresponds to a predetermined imaging control. For example, the control unit 104 sets the threshold value that corresponds to an imaging start of the moving image. Note that the region corresponding to the threshold value can be a region A6 illustrated in FIG. 14.

Next, when the radio waves that reach the threshold value are received from the communication device 200-2, the control unit 104 performs the imaging control, and counts the transmission sources of the received radio waves. For example, when the communication device 200-2A enters the region A6 as illustrated in FIG. 14, and the radio wave of the strength that exceeds the threshold value is received from the communication device 200-2A, the control unit 104 performs the imaging control that corresponds to the threshold value, for example a record start instruction of the moving image. Then, the control unit 104 counts up the number of communication devices 200-2 that exist within the region A6. Also, when the radio wave that reaches the threshold value is received from another communication device 200-2B illustrated in FIG. 14 after the counting up, the control unit 104 counts up the number of communication devices 200-2 within the region A6, while maintaining the state of the imaging control.

Next, the control unit 104 reduces the count of the transmission sources, each time the strength of the radio wave received from the communication device 200-2 becomes lower than the threshold value. For example, when the communication device 200-2A moves out of the region A6, and the strength of the radio wave received from the communication device 200-2A becomes lower than the threshold value, the control unit 104 counts down the number of communication devices 200-2 within the region A6.

Then, the control unit 104 performs the imaging control when the count of the transmission sources becomes zero. For example, when the last communication device 200-2B that remains in the region A6 moves out of the region 46, and the strength of the radio wave transmitted from the communication device 200-2B becomes lower than the threshold value, the control unit 104 issues a moving image recording stop instruction.

The imaging control device 100-2 according to the above present exemplary variant can be applied to competition sports or the like in which a group of persons or objects moves. For example, the imaging control device 100-2 according to the present exemplary variant can be utilized in competition sports such as a marathon or an enduro race.

In more detail, the imaging control device 100-2 is installed at each point P1 to P5 on a course as illustrated in FIG. 15, and runners hold wireless IC tags or the like as the communication devices 200-2. Note that, when the wireless IC tag and the imaging control device 100-2 perform Bluetooth communication, authentication registration work such as pairing is performed in advance.

Next, when a leading runner among the runners reaches the region corresponding to the threshold value of the imaging control device 100-2 at each point of the course, the imaging control device 100-2 starts the imaging. Then, when the runners go out of the region corresponding to the threshold value of the imaging control device 100-2, the imaging control device 100-2 stops the imaging.

Then, each imaging control device 100-2 transmits a moving image, a still image, or the like captured by the imaging, to a server via a communication network. Thereafter, the user can refer to the moving image, the still image, or the like by accessing the server.

As described above, according to the exemplary variant of the present embodiment, the imaging control device 100-2 performs the imaging control on the basis of the change, with regard to the threshold value, of the strength of the radio waves received from all communication devices 200-2 that have transmitted the radio waves that reach the threshold value, among a plurality of communication devices 200-2. Hence, the imaging control is performed for one group including a plurality of communication devices 200-2, and thereby an image of the group together can be captured.

Note that the above specific communication device 200-2 may be decided on the basis of user operation. Specifically, the user is allowed to select one of the method of the second embodiment and the method of the present exemplary variant, and the control unit 104 performs the process in accordance with the selected method.

<4. Third Embodiment (Example in Which Repeater is Provided Between Imaging Control Device and Communication Device)>

In the above, the imaging control device 100-2 according to the second embodiment of the present disclosure has been described. Next, an imaging control device 100-3 according to the third embodiment of the present disclosure will be described. In the third embodiment, a repeater 300 performs communication with a communication device 200-3.

<4-1. Configuration of Device>

First, with reference to FIG. 16, the physical configuration of the imaging control device 100-3, the repeater 300, and the communication device 200-3 according to the third embodiment of the present disclosure will be described. FIG. 16 is a diagram illustrating the schematic physical configuration of the imaging control device 100-3, the repeater 300, and the communication device 200-3 according to the present embodiment.

In the present embodiment, the imaging control device 100-3 is installed at a position where it is difficult to directly communicate with the communication device 200-3. For example, when the communication distance is approximately 20 m, the imaging control device 100-3 can be installed at a position 40 m or more away from a position that the communication device 200-3 passes, as illustrated in FIG. 16.

Thus, the repeater 300 is installed between the imaging control device 100-3 and the position that the communication device 200-3 passes. For example, two repeaters 300 can be installed at 20 m intervals between the imaging control device 100-3 and the position the communication device 200-3 passes, as illustrated in FIG. 16.

Figure 17:
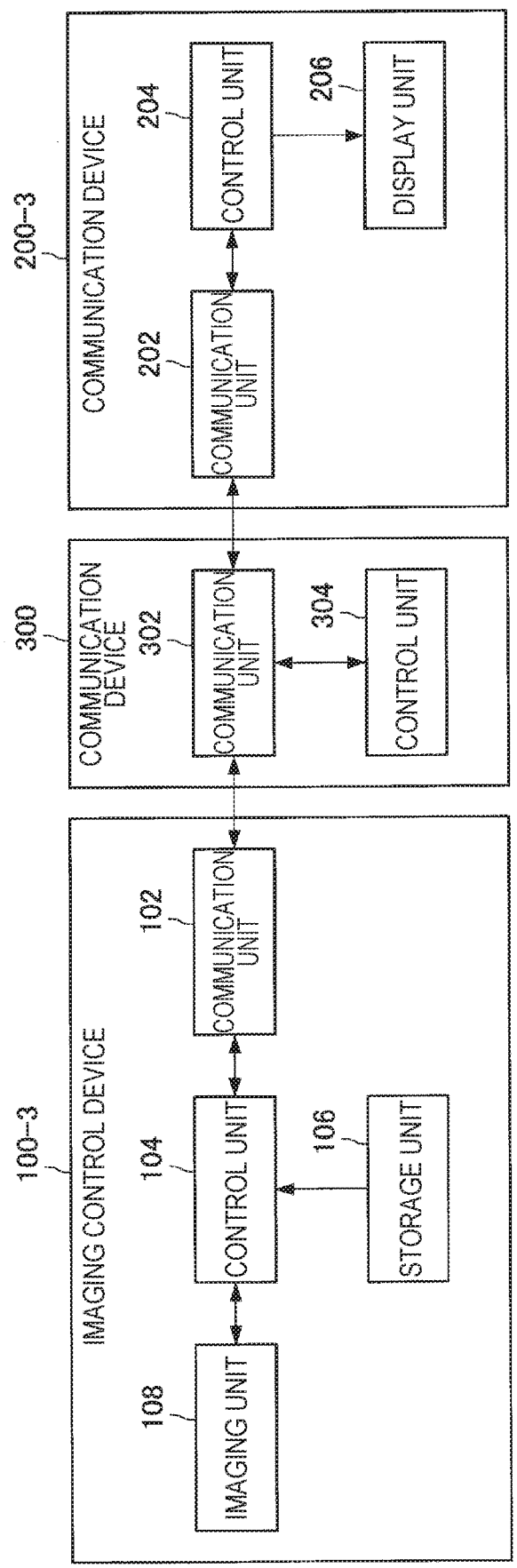
FIG. 17 is a block diagram illustrating a schematic functional configuration of an imaging control device, a repeater, and a communication device according to this embodiment.

Next, with reference to FIG. 17, the functional configuration of the imaging control device 100-3, the repeater 300, and the communication device 200-3 according to the present embodiment will be described. FIG. 17 is a block diagram illustrating the schematic functional configuration of the imaging control device 100-3, the repeater 300, and the communication device 200-3 according to the present embodiment. Note that the configuration of the imaging control device 100-2 and the communication device 200-3 according to the present embodiment is substantially same as the configuration according to the first or second embodiment, but the function of the control unit 104 differs partially. Hence, the imaging control device 100-3 will be described only with regard to the control unit 104. Moreover, the description of the substantially same function as the first or second embodiment will be omitted.

(Configuration of Repeater)

The repeater 300 includes a communication unit 302 and a control unit 304, as illustrated in FIG. 17, as a relay device. Note that FIG. 17 illustrates an example in which there is one repeater 300.

The communication unit 302 performs communication with the imaging control device 100-3 and the communication device 200-3. Specifically, the communication unit 302 relays an operation instruction or the like received from the communication device 200-3 to the imaging control device 100-3, and relays an image received from the imaging control device 100-3 to the communication device 200-3. Also, the communication unit 302 transmits, to the imaging control device 100-3, the information (hereinafter, also referred to as repeater information) that includes the radio wave strength information or the like generated by the repeater 300. Note that the communication with the imaging control device 100-3 may be wired communication.

Also, the communication unit 302 generates the radio wave strength information indicating the strength of the received radio wave, as an acquisition unit. Specifically, when the radio wave is received from the communication device 200-3, the communication unit 302 generates the radio wave strength information indicating the received radio wave strength of the radio wave.

The control unit 304 controls the operation of the repeater 300 overall. Specifically, the control unit 304 causes the communication unit 302 to perform a relay process of the information as described above. For example, the control unit 304 causes the communication unit 302 to transmit, to the imaging control device 100-3, repeater information that includes the radio wave strength information generated by the communication unit 302 and the identification information for identifying the repeater 300.

(Configuration of Imaging Control Device)

The communication unit 102 performs communication with the repeater 300. Specifically, the communication unit 102 receives the repeater information transmitted from the repeater 300, and acquires the radio wave strength information from the received repeater information, as the acquisition unit. Also, the communication unit 102 performs communication with the communication device 200-3 via the repeater 300. Note that "acquisition" of the radio wave strength information of the communication unit 102 that operates as the acquisition unit may be performed with a request of the radio wave strength information, and may merely receive the radio wave strength information. For example, the communication unit 102 may receive the radio wave strength information by requesting the transmission of the radio wave strength information to the repeater 300, and may receive the radio wave strength information transmitted spontaneously from the repeater 300.

The control unit 104 performs the imaging control on the basis of the repeater information. Specifically, the control unit 104 specifies the distance to the repeater 300 from the identification information of the repeater 300 included in the repeater information, and performs the imaging control on the basis of the specified distance and the relationship between the radio wave strength information and the threshold value.

For example, the information (hereinafter, also referred to as distance information) indicating the distance to the repeater 300 from the imaging control device 100-3 corresponding to the identification information of the repeater 300 is stored in the storage unit 106. Then, when the repeater information is received, the control unit 104 acquires the distance information from the storage unit 106 on the basis of the identification information of the repeater 300 included in the repeater information.

Next, the control unit 104 specifies the threshold value of the received signal strength on the basis of the acquired distance information, and determines whether the value indicated by the radio wave strength information included in the repeater information reaches the specified threshold value. Note that the threshold value is set corresponding to the distance information. For example, when the boundary of the imaging control, that is, the region corresponding to the threshold value is set at an approximately constant distance from the imaging control device 100-3, the threshold value is set higher as the value indicated by the distance information becomes larger, and the threshold value is set lower as the value indicated by the distance information becomes smaller.

Then, when it is determined that the value indicated by the radio wave strength information reaches the threshold value, the control unit 104 performs the imaging control, such as the record start instruction of the moving image.

Although the above description has described an example in which the distance information is stored in the storage unit 106, the control unit 104 may calculate the distance to the repeater 300 from the strength of the radio wave used in the communication with the repeater 300. Also, the position information indicating the position of the repeater 300 may be included in the repeater information, and the distance from the imaging control device 100-3 to the repeater 300 may be calculated by using the position information and position information of the device itself.

<4-2. Process of Device>

Figure 18:
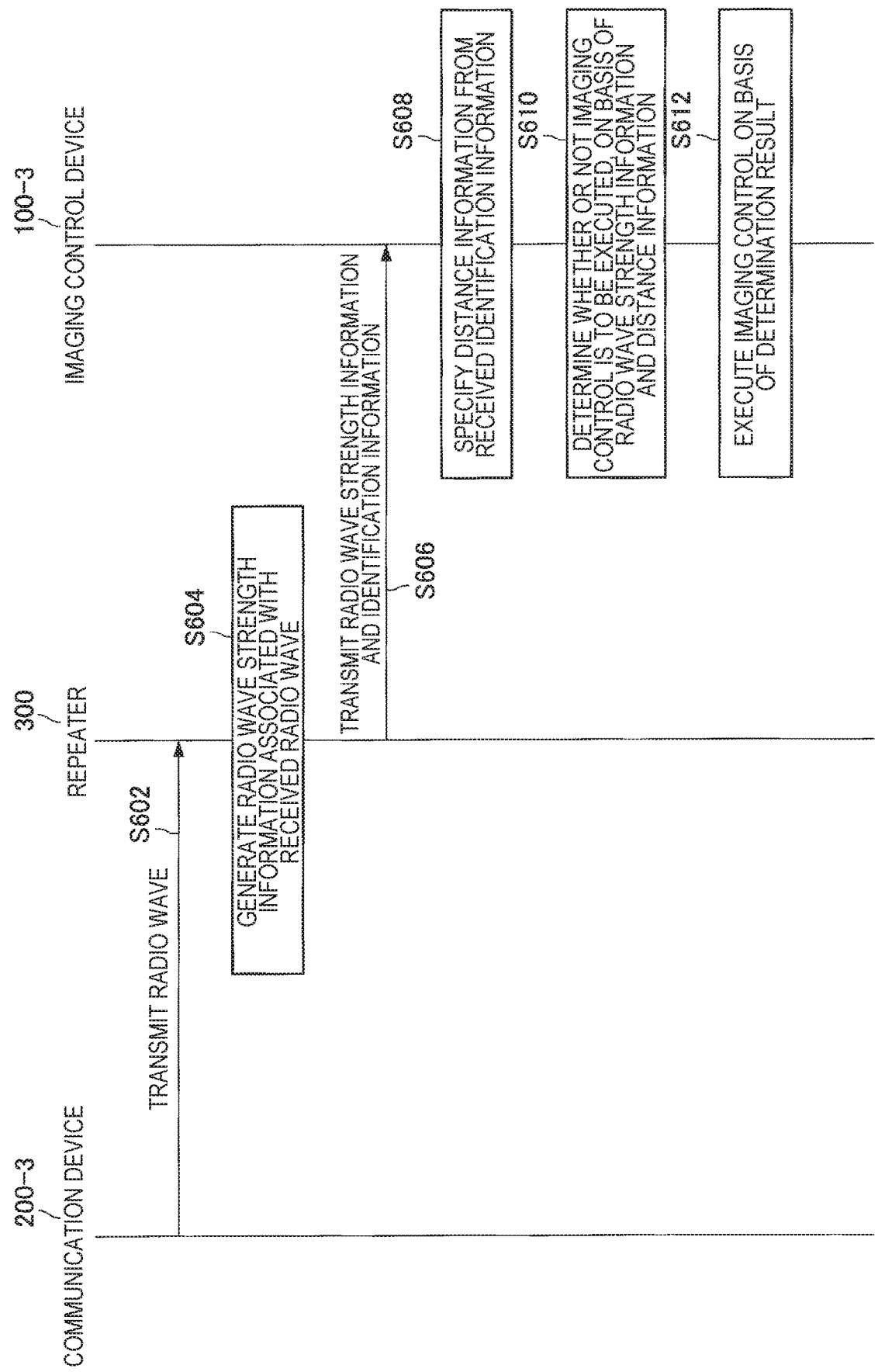
FIG. 18 is a sequence diagram conceptually illustrating a process of an imaging control device, a repeater, and a communication device according to this embodiment.

Next, with reference to FIG. 18, the process of the imaging control device 100-3, the repeater 300, and the communication device 200-3 according to the present embodiment will be described. FIG. 18 is a sequence diagram conceptually illustrating the process of the imaging control device 100-3, the repeater 300, and the communication device 200-3 according to the present embodiment. Note that the description of the substantially same process as the processes in the first and second embodiments will be omitted.

First, the communication device 200-3 transmits the radio wave (step S602). Specifically, the communication unit 202 periodically transmits the radio wave on the basis of an instruction of the control unit 204.

When the radio wave is received, the repeater 300 generates the radio wave strength information associated with the received radio wave (step S604). Specifically, when the radio wave is received from the communication device 200-3, the communication unit 302 generates the radio wave strength information indicating the strength of the radio wave.

Next, the repeater 300 transmits the radio wave strength information and the identification information to the imaging control device 100-3 (step S606). Specifically, the control unit 304 generates the repeater information that includes the generated radio wave strength information and the identification information for identifying the repeater 300, and causes the communication unit 302 to transmit the generated repeater information to the imaging control device 100-3. Note that, when it is difficult for the repeater 300 to communicate with the imaging control device 100-3 directly, the repeater 300 transmits the repeater information to the imaging control device 100-3 via another repeater 300. In this case, the other repeater 300 performs the relay process of the repeater information.

If the radio wave strength information and the identification information are received, the imaging control device 100-3 specifies the distance information from the received identification information (step S608). Specifically, the control unit 104 acquires the distance information indicating the distance to the repeater 300 from the storage unit 106, on the basis of the received identification information.

Next, the imaging control device 100-3 determines whether or not the imaging control is to be executed on the basis of the radio wave strength information and the distance information (step S610). Specifically, the control unit 104 specifies the threshold value of the received signal strength from the acquired distance information, and determines whether the value indicated by the radio wave strength information reaches the specified threshold value.

Next, the imaging control device 100-3 executes the imaging control on the basis of the determination result (step S612). Specifically, if it is determined that the value indicated by the radio wave strength information reaches the specified threshold value, the control unit 104 performs the imaging control that corresponds to the specified threshold value.

As described above, according to the third embodiment of the present disclosure, the imaging control device 100-3 acquires the radio wave strength information from the repeater 300 that receives the radio wave from the communication device, and performs the imaging control on the basis of the change of the radio wave strength information. Hence, the imaging control is performed within a wider range than the communication range of the imaging control device 100-3, and thereby an object that holds the communication device 200-3 that is positioned farther than the communication distance of the imaging control device 100-3 can be set as the target of the imaging control.

Although the above description has described an example in which the control unit 104 performs the imaging control on the basis of the distance information and the relationship between the radio wave strength information and the threshold value, the control unit 104 may perform the imaging control on the basis of only the relationship between the radio wave strength information and the threshold value. For example, when each of the repeaters 300 is fixed, if the repeater information is received, the control unit 104 determines whether the value indicated by the radio wave strength information included in the repeater information reaches the threshold value corresponding to the repeater 300 which is the transmission source of the repeater information. When it is determined that the value reaches the threshold value, the control unit 104 performs the imaging control that corresponds to the threshold value. Further, when the repeaters 300 are located at the same distance from the imaging control device 100-3, the threshold value may be a common value at each of the repeaters 300.

<4-3. Exemplary Variant>

In the above, the third embodiment of the present disclosure has been described. Note that the present embodiment is not limited to the above example. In the following, an exemplary variant of the present embodiment will be described.

Figure 19:
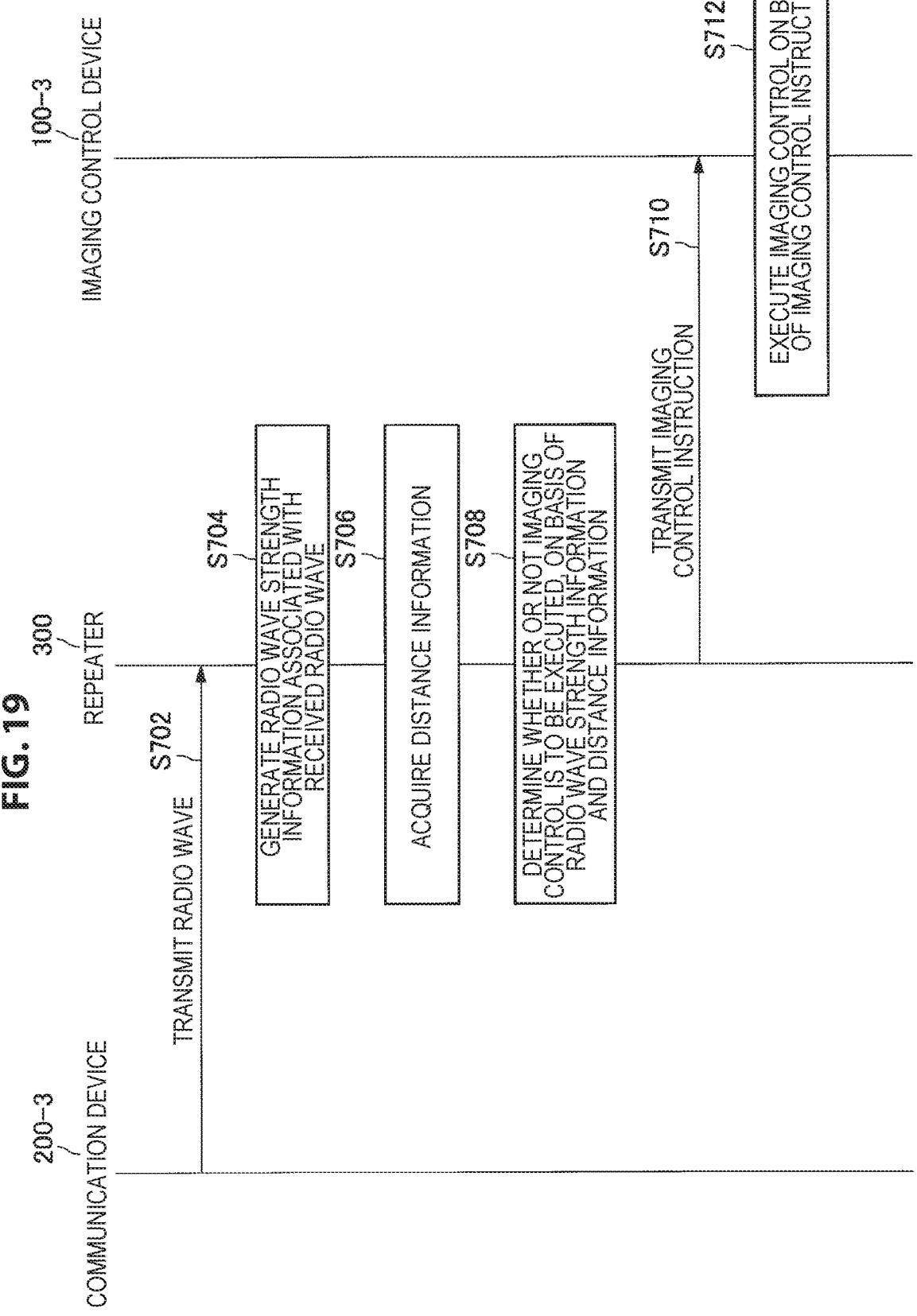
FIG. 19 is a sequence diagram conceptually illustrating a process of an imaging control device, a repeater, and a communication device according to an exemplary variant of this embodiment.

As the exemplary variant of the present embodiment, the repeater 300 may perform the imaging control, instead of or together with the imaging control device 100-3. Specifically, the control unit 304 performs the imaging control on the basis of the relationship between the radio wave strength information generated by the communication unit 302 and the threshold value and the distance from the imaging control device 100-3 to the repeater 300. Further, with reference to FIG. 19, the process of the present exemplary variant will be described in detail. FIG. 19 is a sequence diagram conceptually illustrating the process of the imaging control device 100-3, the repeater 300, and the communication device 200-3 according to the exemplary variant of the present embodiment. Note that the description of the substantially same process as the process in the third embodiment will be omitted.

First, the communication device 200-3 transmits the radio wave (step S702), and the repeater 300 that has received the radio wave from the communication device 200-3 generates the radio wave strength information associated with the received radio wave (step S704).

Next, the repeater 300 acquires the distance information (step S706). Specifically, the control unit 304 acquires the distance information indicating the distance from the repeater 300 to the imaging control device 100-3 which is stored in the storage unit that the repeater 300 includes additionally.

Next, the repeater 300 determines whether or not the imaging control is to be executed on the basis of the radio wave strength information and the distance information (step S708). Specifically, the control unit 304 specifies the threshold value of the received signal strength from the acquired distance information, and determines whether the value indicated by the radio wave strength information reaches the specified threshold value.

Next, the repeater 300 transmits the imaging control instruction to the imaging control device 100-3 (step S710). Specifically, if it is determined that the value indicated by the radio wave strength information reaches the specified threshold value, the control unit 304 transmits the imaging control instruction, for example the record start instruction or the like of the moving image, to the imaging control device 100-3.

If the imaging control instruction is received, the imaging control device 100-3 executes the imaging control on the basis of the imaging control instruction (step S712). Specifically, the control unit 104 instructs operation to the imaging unit 108 on the basis of the received imaging control instruction.

As described above, according to the exemplary variant of the present embodiment, the repeater 300 performs the imaging control on the basis of the radio wave strength information and the distance from the imaging control device 100-3 to the repeater 300. Hence, the configuration and the process of the imaging control device 100-3 are simplified, and thereby cost reduction and electrical power saving of the imaging control device 100-3 are enabled.

<5. Fourth Embodiment (Example in Which User Report Function is Provided)>

In the above, the imaging control device 100-3 according to the third embodiment of the present disclosure has been described. Next, an imaging control device 100-4 according to a fourth embodiment of the present disclosure will be described. In the fourth embodiment, the state of the imaging control of the imaging control device 100-4 is reported to the user.

<5-1. Configuration of Device>

Figure 20:
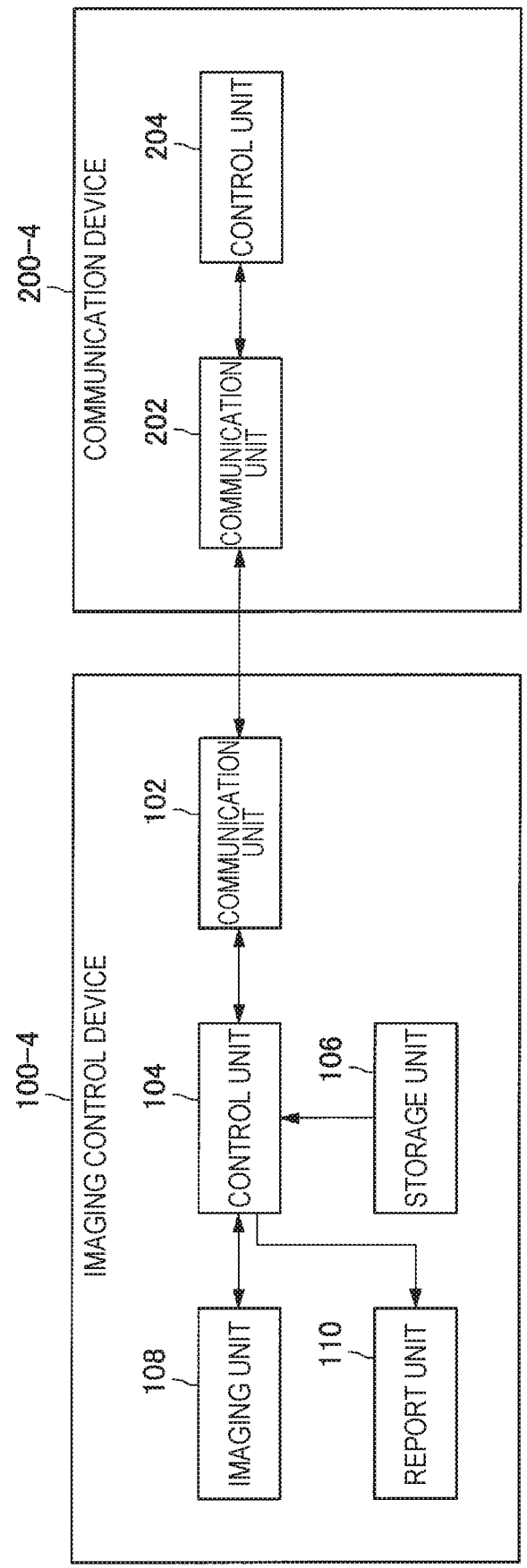
FIG. 20 is a block diagram illustrating a schematic functional configuration of an imaging control device and a communication device according to a fourth embodiment of the present disclosure.

First, with reference to FIG. 20, the functional configuration of the imaging control device 100-4 and the communication device 200-4 according to the present embodiment will be described. FIG. 20 is a block diagram illustrating the schematic functional configuration of the imaging control device 100-4 and the communication device 200-4 according to the present embodiment. Note that the description of the substantially same function as the first to third embodiments \kill be omitted.

(Configuration of Imaging Control Device)

The imaging control device 100-4 includes a report unit 110, in addition to the communication unit 102, the control unit 104, the storage unit 106, and the imaging unit 108, as illustrated in FIG. 20.

The report unit 110 makes a report to the user. Specifically, the report unit 110 performs user perceivable output on the basis of the instruction of the control unit 104. For example, the report unit 110 can be an output device that performs display output, sound output, tactile vibration output, or the like.

Figure 21:
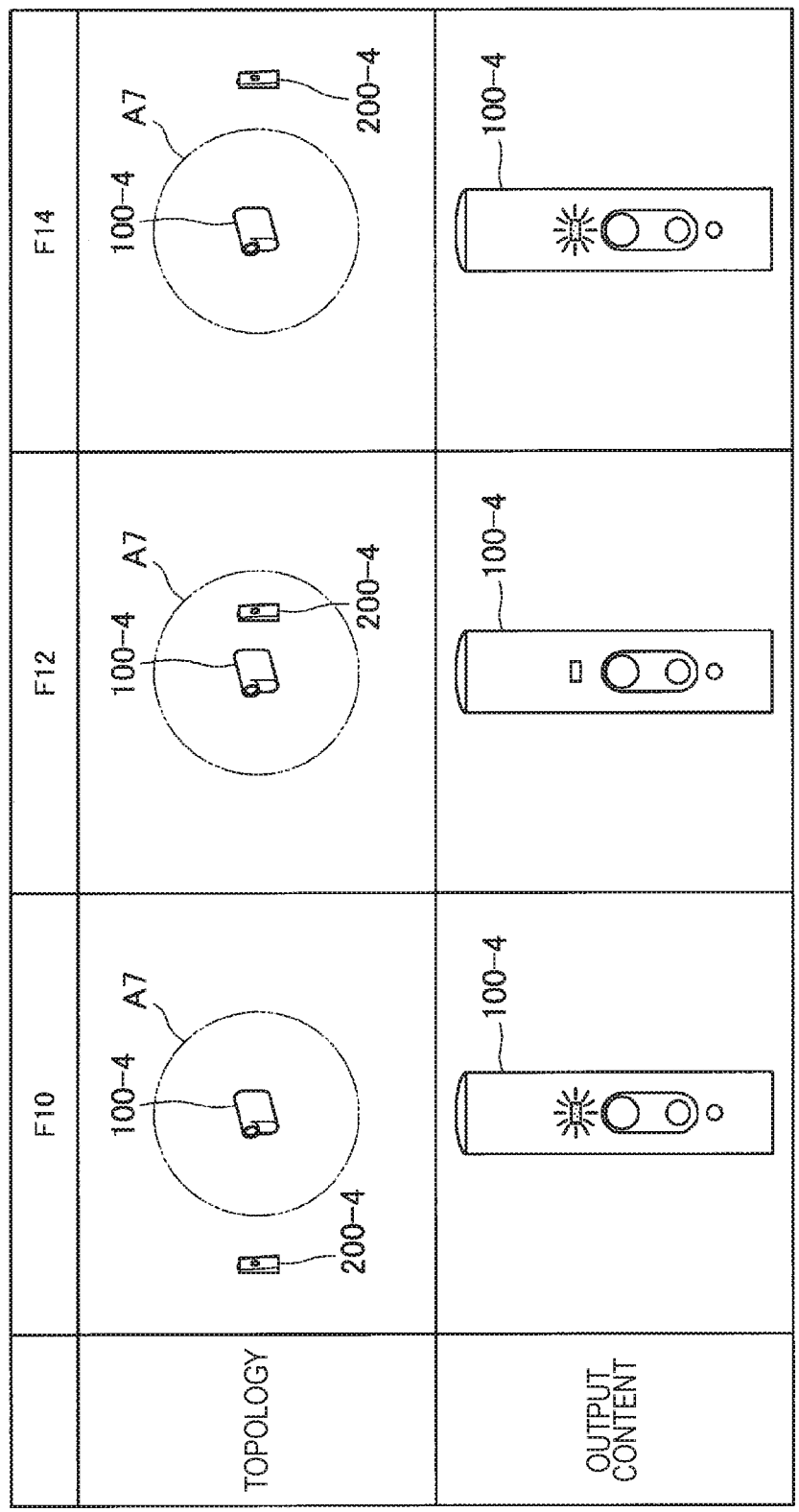
FIG. 21 is a diagram for describing a user report process of an imaging control device according to this embodiment.

The control unit 104 controls the operation of the report unit 110. Specifically, the control unit 104 decides the output that corresponds to the state of the imaging control, and issues an operation instruction associated with the decided output to the report unit 110. Further, with reference to FIG. 21, a user report process will be described in detail. FIG. 21 is a diagram for describing the user report process of the imaging control device 100-4 according to the present embodiment.

First, when the communication device 200-4 is outside the region A7 corresponding to the threshold value, as illustrated in F10 of FIG. 21, the control unit 104 causes the report unit 110 to perform blinking display indicating a standby state toward the imaging unit 108.

Thereafter, when the communication device 200-4 enters the region A7 as illustrated in F12 of FIG. 21, the control unit 104 performs the imaging control such as the record start instruction of the moving image to the imaging unit 108, and causes the report unit 110 to perform color display indicating a recording state of the moving image.

Then, when the communication device 200-4 moves out of the region A7 as illustrated in F14 of FIG. 21, the control unit 104 performs the imaging control such as the moving image recording stop instruction to the imaging unit 108, and causes the report unit 110 to perform the blinking display indicating the standby state.

(Configuration of Communication Device)

The configuration of the communication device is substantially same as the configuration in the second embodiment, and thus the description will be omitted, <5-2. Process of Device>

The process associated with the imaging control of the imaging control device 100-4 in the present embodiment is substantially same as the first to third embodiments, and thus the description will be omitted.

As described above, according to the fourth embodiment of the present disclosure, the imaging control device 100-4 controls the report, to the user, of the state of the imaging control. Hence, the user serving as the imaging subject can be prompted to perform an action responding to the state of the imaging control, for example a pose or the like, toward the imaging control device 100-4, and thereby an image intended by the user can be captured, and the satisfaction degree of the user can be improved.

<5-3. Exemplary Variant>

In the above, the fourth embodiment of the present disclosure has been described. Note that the present embodiment is not limited to the above example. In the following, an exemplary variant of the present embodiment will be described.

Figure 22:
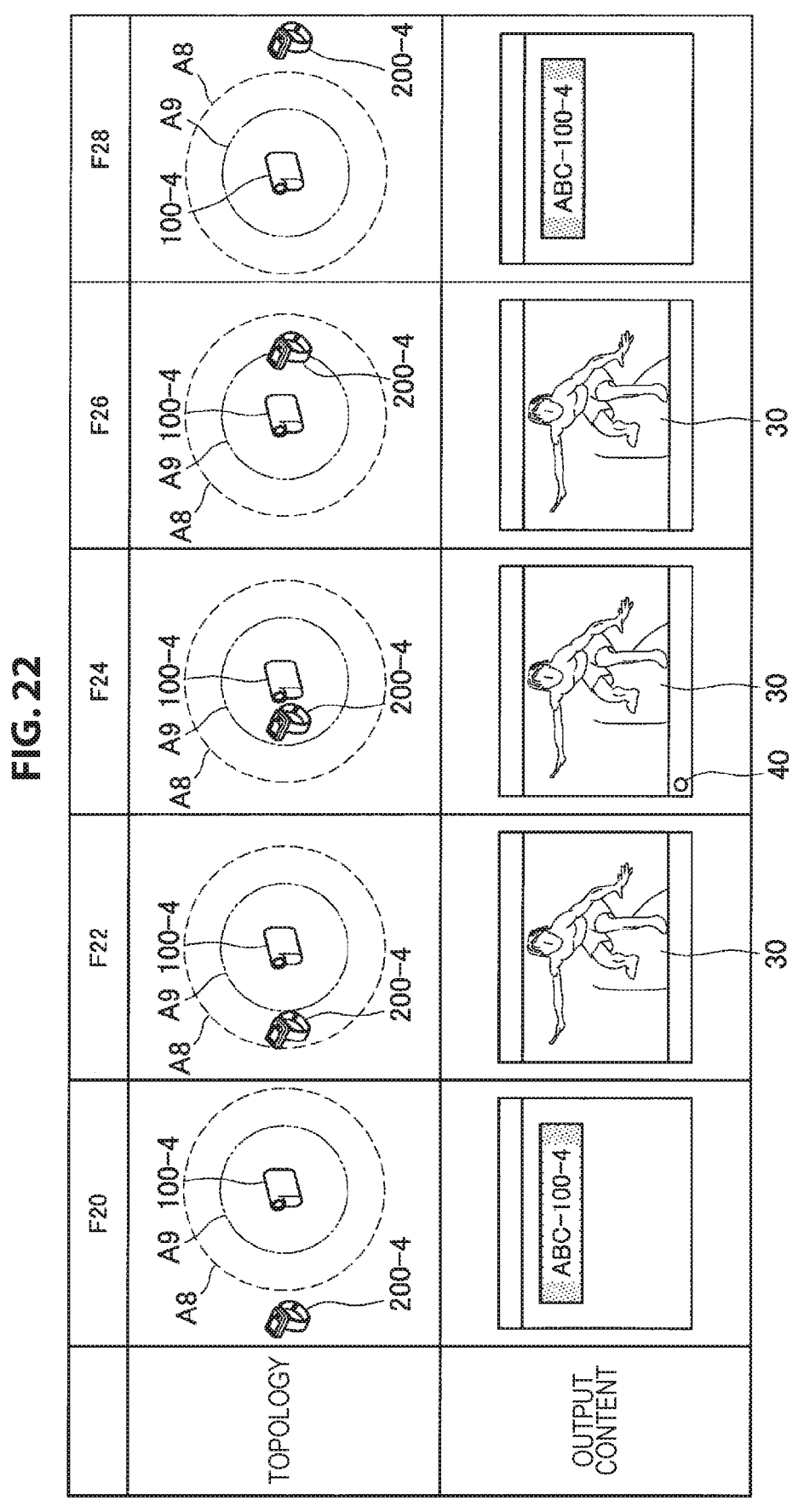

As the exemplary variant of the present embodiment, the user report may be performed at the communication device 200-4 side, instead of or in addition to performing the user report at the imaging control device 100-4 side. Specifically, the imaging control device 100-4 transmits to the communication device 200-4 the information (hereinafter, also referred to as imaging control state information) indicating the state of the imaging control, and the communication device 200-4 performs the user report on the basis of the received imaging control state information. Further, with reference to FIG. 22, the process of the present exemplary variant will be described in detail. FIG. 22 is a diagram for describing the user report process of the communication device 200-4 according to the exemplary variant of the present embodiment.

First, when the communication device 200-4 is outside a region A8 corresponding to the threshold value as illustrated in F20 of FIG. 22, the control unit 104 causes the communication unit 102 to transmit the imaging control state information indicating the standby state to the communication device 200-4. Then, when the imaging control state information is received, the control unit 204 causes the display unit 206 in the first embodiment or the like to display the object indicating the imaging control device 100-4 in gray indicating that the imaging control device 100-4 is in the standby state, as illustrated in F20 of FIG. 22. Note that the communication device 200-4 according to the present exemplary variant can be a remote controller of the imaging control device 100-4.

Next, when the communication device 200-4 moves to a position inside the region A8 and outside a region A9 corresponding to a higher threshold value than the threshold value corresponding to the region A8 as illustrated in F22 of FIG. 22, the control unit 104 instructs the imaging unit 108 to turn on the power supply. In addition to that, the control unit 104 causes the communication unit 102 to transmit, to the communication device 200-4, the imaging control state information indicating that the state of the imaging control is in the imaging preparation state. Note that the control unit 104 can start transmitting to the communication device 200-4 the image captured by the imaging of the imaging unit 108, in addition to transmitting the imaging control state information. Then, when the imaging control state information is received, the control unit 204 displays the image 30 supplied from the imaging control device 100-4 on the display unit 206, as illustrated in F22 of FIG. 22.

Next, when the communication device 200-4 enters the region A9 as illustrated in F24 of FIG. 22, the control unit 104 issues the record start instruction of the moving image or the like. In addition to that, the control unit 104 causes the communication unit 102 to transmit, to the communication device 200-4, the imaging control state information indicating the state of the imaging control is in the moving image recording state. Then, when the imaging control state information is received, the control unit 204 causes the display unit 206 to display an object 40 indicating the recording state of the moving image, as illustrated in F24 of FIG. 22.

Next, when the communication device 200-4 moves to a position outside the region A9 and inside the region A8 as illustrated in F26 of FIG. 22, the control unit 104 issues the moving image recording stop instruction. In addition to that, the control unit 104 causes the communication unit 102 to transmit, to the communication device 200-4, the imaging control state information indicating that the state of the imaging control is in the imaging preparation state. Then, when the imaging control state information is received, the control unit 204 causes the display unit 206 to delete the object 40 indicating the recording state of the moving image, as illustrated in F26 of FIG. 22.

Then, when the communication device 200-4 moves out of the region A8 as illustrated in F28 of FIG. 22, the control unit 104 causes the communication unit 102 to transmit to the communication device 200-4 the imaging control state information indicating the standby state. Then, when the imaging control state information is received, the control unit 204 causes the display unit 206 to return to the screen image in which the object indicating the imaging control device 100-4 is displayed in gray, as illustrated in F28 of FIG. 22.

As described above, according to the exemplary variant of the present embodiment, the communication device 200-4 provides the report to the user on the basis of the state of the imaging control supplied from the imaging control device 100-4. Hence, the state of the imaging control is reported directly to the user serving as the imaging subject, and thereby even when the imaging control device 100-4 operates automatically, an image intended by the user is captured, and the convenience can be improved.

<6. Hardware Configuration of Imaging Control Device According to One Embodiment of Present Disclosure>

In the above, the imaging control device 100 according to each embodiment of the present disclosure has been described. The above process of the imaging control device 100 is achieved by the cooperation between software and hardware of the imaging control device 100 described below.

FIG. 23 is an explanatory diagram that illustrates a hardware configuration of the imaging control device 100 according to an embodiment of the present disclosure. As illustrated in FIG. 23, the imaging control device 100 includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as a computation processing device, and cooperates with various types of programs to achieve the operation of the control unit 104 in the imaging control device 100. Also, the CPU 132 may be a microprocessor. The ROM 134 stores programs, calculation parameters, or the like, used by the CPU 132. The RAM 136 temporarily stores the programs used in the execution of the CPU 132 or the parameters that change as appropriate in the execution, for example. The ROM 134 and the RAM 136 constitute a part of the storage unit 106 in the imaging control device 100. The CPU 132, the ROM 134, and the RAM 136 are connected to each other via an internal bus configured with a CPU bus or the like.

The input device 144 is configured with an input means for the user to input information, such as a mouse, a keyboard, a touch panel, a button, a microphone, a switch, and a lever, and an input control circuit that generates an input signal on the basis of an input by a user and outputs the input signal to the CPU 132, for example. The user of the imaging control device 100 can input various types of data to the imaging control device 100 and instruct the processing operation, by operating the input device 144.

The output device 146 performs outputting to a device such as a liquid crystal display (LCD) device, an organic light emitting diode (OLED) device, and a lamp, for example. Further, the output device 146 may perform sound outputting of a speaker, a headphone, and the like.

The storage device 148 is a device for data storage. The storage device 148 may include a storage medium, a record device that records data in the storage medium, a reading device that reads out data from the storage medium, a deleting device that deletes the data recorded in the storage medium, and the like. The storage device 148 stores the programs executed by the CPU 132 and various types of data.

The drive 150 is a reader/writer for the storage medium, and is provided inside or externally attached to the imaging control device 100. The drive 150 reads out the information recorded in a removable storage medium, such as a magnetic disk, an optical disc, a magneto-optical disk, or a semiconductor memory, which is put in the drive 150, and outputs the information to the RAM 134. Also, the drive 150 can write information into the removable storage medium.

The connection port 152 is a bus for connecting to an information processing apparatus or a peripheral device outside the imaging control device 100, for example. Also, the connection port 152 may be a universal serial bus (USB).

The communication device 154 is a communication interface configured with a communication device for connecting to a network, as an example of the communication unit 102 of the imaging control device 100, for example. Also, the communication device 154 is a wireless local area network (LAN) compatible communication device in most cases, but may be a long term evolution (LTE) compatible communication device.

<7. Conclusion>

In the above, according to the first embodiment of the present disclosure, the imaging control is performed on the basis of the strength of the received radio wave that corresponds to the distance to the communication partner, in one imaging control device 100, and thereby an image can be captured at a proper timing, while suppressing the increase of the cost.

Also, according to the second embodiment of the present disclosure, the imaging control is performed on the basis of only the communication device 200-2 that the user wants it to be the imaging target, among a plurality of communication devices 200-2, thereby increasing the situations in which the imaging control device 100-2 can be utilized, and improving the convenience.

Also, according to the third embodiment of the present disclosure, the imaging control is performed within a wider range than the communication range of the imaging control device 100-3, and thereby the object that holds the communication device 200-3 that is positioned farther than the communication distance of the imaging control device 100-3 can be set as the target of the imaging control.

Also, according to the fourth embodiment of the present disclosure, the user serving as the imaging subject can be prompted to perform an action responding to the state of the imaging control, for example a pose or the like, toward the imaging control device 100-4, and thereby an image intended by the user can be captured, and the satisfaction degree of the user can be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the imaging control is performed on the basis of the change of the received signal strength with regard to the threshold value, but the present technology is not limited to this example. For example, the imaging control may be performed on the basis of the change in terms of whether or not the radio wave is received. For example, when the radio wave is received from the communication device 200, the communication unit 102 generates the radio wave strength information indicating the strength of the radio wave, and the control unit 104 performs the imaging control when the radio wave strength information is generated by the communication unit. Note that the control unit 104 may perform the imaging control, when the value indicating the radio wave strength information generated by the communication unit 102 changes between zero and a value that differs from zero.

Although the above embodiment has described an example in which the imaging control is performed when it is determined that the received signal strength has reached the threshold value, the imaging control may be performed after the threshold value is reached and after a predetermined time has elapsed.

Although the above embodiment has described that the communication device 200 may be a remote controller of the imaging control device 100, the communication device 200 may be a portable communication terminal, such as a smartphone, that includes an application having a control function of the imaging control device 100.

Although the above embodiment has described an example in which the imaging control that corresponds to the threshold value is performed, the imaging control to be executed may be specified on the basis of the threshold value and a difference from the threshold value. For example, the threshold value that corresponds to turning on the power supply of the imaging unit 108 and a difference value or a coefficient that corresponds to the record start instruction of the moving image are stored in the storage unit 106, and after instructing turning on of the power supply of the imaging unit 108, the control unit 104 compares the value obtained by adding the difference value to the threshold value or multiplying the threshold value by the coefficient, with the received signal strength.

Although the above embodiment has described an example in which the imaging control device 100 is a single body, there may be a plurality of imaging control devices 100. In this case, each of the imaging control devices 100 executes one or all of the processes described in each of the above embodiments.

Also, the processes according to the above embodiments and the exemplary variants may be combined with each other. For example, in the exemplary variant of the fourth embodiment, it may be such that the information indicating that the tag is attached to the moving image data in the second exemplary variant of the first embodiment is transmitted to the communication device 200, and the fact is reported to the user in the communication device 200.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)
An imaging control device including:
an acquisition unit that acquires radio wave strength information indicating strength of a received radio wave; and
a control unit that performs imaging control on the basis of a change of the radio wave strength information acquired by the acquisition unit.

(2)
The imaging control device according to (1), in which
the control unit performs the imaging control on the basis of the change of the radio wave strength information with regard to a threshold value of the strength of the radio wave.

(3)
The imaging control device according to (2), in which
a plurality of the threshold values are provided, and
the control unit performs the imaging control corresponding to each of the threshold values when the strength of the radio wave indicated by the radio wave strength information reaches each of the threshold values.

(4)
The imaging control device according to (3), in which
the control unit sets a threshold value selected from each of the plurality of threshold values, and changes the set threshold value to another threshold value when the strength of the radio wave indicated by the radio wave strength information reaches the set threshold value.

(5)
The imaging control device according to any one of (2) to (4), in which
the imaging control includes a start and an end of imaging in continuous imaging operation.

(6)
The imaging control device according to any one of (2) to (4), in which
the imaging control includes setting associated with imaging.

(7)
The imaging control device according to any one of (2) to (4), in which
the imaging control includes attaching information to an image obtained by the imaging operation, in continuous imaging operation.

(8)
The imaging control device according to any one of (3) to (7), in which
the control unit determines whether or not the threshold value is reached, on the basis of a measurement mode of the strength of the radio wave indicated by a plurality of pieces of the radio wave strength information.

(9)
The imaging control device according to (8), in which
the measurement mode includes a predetermined number of emergences of a period having a predetermined length during which the strength of the radio wave indicated by the radio wave strength information continues to exceed the threshold value.

(10)
The imaging control device according to (8), in which the measurement mode includes a predetermined number of exceedances of the strength of the radio wave indicated by the radio wave strength information over the threshold value, during a period having a predetermined length.

(11)
The imaging control device according to (8), in which the measurement mode includes exceedance, over the threshold value, of a representative value of the strength of the radio wave indicated by the radio wave strength information during a period having a predetermined length.

(12)
The imaging control device according to any one of (2) to (11), in which
in a case where the radio waves are received from a plurality of communication devices, the control unit performs the imaging control on the basis of a change, with regard to the threshold value, of the strength of the radio wave received from a specific communication device among the plurality of communication devices.

(13)
The imaging control device according to (12), in which the specific communication device includes a communication device that has transmitted the radio wave that has reached the threshold value before radio waves received from other communication devices.

(14)
The imaging control device according to (12), in which the specific communication device includes all communication devices that have transmitted the radio waves that reach the threshold value.

(15)
The imaging control device according to any one of (2) to (14), in which
the threshold value is set on the basis of user operation.

(16)
The imaging control device according to (15), in which the user operation includes selection of imaging content, and
the control unit sets the threshold value corresponding to the selected imaging content.

(17)
The imaging control device according to any one of (2) to (16), in which
the acquisition unit acquires the radio wave strength information from a relay device that receives the radio wave from a communication device.

(18)
The imaging control device according to any one of (2) to (17), in which
the control unit controls a report, to a user, of a state of the imaging control.

(19)
An imaging control method including:
acquiring, by an acquisition unit, radio wave strength information indicating a strength of a received radio wave; and
performing imaging control on the basis of a change of the radio wave strength information acquired by the acquisition unit.

(20)
An imaging control system including:
a communication device that includes a communication unit that transmits a radio wave; and
an imaging control device that includes
an acquisition unit that acquires radio wave strength information indicating a strength of the radio wave received from the communication unit of the communication device, and
a control unit that performs imaging control on the basis of a change of the radio wave strength information acquired by the acquisition unit.

REFERENCE SIGNS LIST 100 imaging control device
102 communication unit
104 control unit
106 storage unit
108 imaging unit
110 report unit
200 communication device
202 communication unit
204 control unit
206 display unit
300 repeater
302 communication unit
304 control unit

The invention claimed is:

1. An imaging control device comprising:
acquisition circuitry configured to acquire radio wave strength information indicating strength of a received radio wave having a frequency between 30 Hz and 300 GHz; and
a controller configured to perform imaging control that adapts processing of a moving image on a basis of a change of the radio wave strength information acquired by the acquisition circuitry,
wherein the controller performs the imaging control on the basis of the change of the radio wave strength information with regard to a first threshold value of a first strength of the radio wave and a second threshold of a second strength of the radio wave, and the imaging control performed by the controller differs when the strength of the radio wave indicated by the radio wave strength information reaches each of the first threshold value and the second threshold value.

2. The imaging control device according to claim 1, wherein
the controller sets a third threshold value when the strength of the radio wave indicated by the radio wave strength information reaches the second threshold value.

3. The imaging control device according to claim 1, wherein
the imaging control includes a start and an end of imaging in continuous imaging operation.

4. The imaging control device according to claim 1, wherein
the imaging control includes setting associated with imaging.

5. The imaging control device according to claim 1, wherein
the imaging control includes attaching information to an image obtained by the imaging operation, in continuous imaging operation.

6. The imaging control device according to claim 1, wherein
the controller is configured to determine whether or not the first threshold value is reached, on the basis of a measurement mode of the strength of the radio wave indicated by a plurality of pieces of the radio wave strength information.

7. The imaging control device according to claim 6, wherein
the measurement mode includes a predetermined number of emergences of a period having a predetermined length during which the strength of the radio wave indicated by the radio wave strength information continues to exceed the first threshold value.

8. The imaging control device according to claim 6, wherein
the measurement mode includes a predetermined number of occurrences of the strength of the radio wave indicated by the radio wave strength information exceeding the first threshold value, during a period having a predetermined length.

9. The imaging control device according to claim 6, wherein
the measurement mode includes exceedance, over the first threshold value, of a representative value of the strength of the radio wave indicated by the radio wave strength information during a period having a predetermined length.

10. The imaging control device according to claim 1, wherein
in a case where the radio wave is one of a plurality of radio waves received from a plurality of communication devices, the controller performs the imaging control on the basis of a change, with regard to the first threshold value, of the strength of one of the radio waves received from a specific communication device among the plurality of communication devices.

11. The imaging control device according to claim 10, wherein
the specific communication device includes a communication device that has transmitted the one of the radio waves that has reached the first threshold value before other ones of the radio waves received from other communication devices.

12. The imaging control device according to claim 10, wherein
the specific communication device includes all communication devices that have transmitted those of the radio waves that reach the first threshold value.

13. The imaging control device according to claim 1, wherein
the first and second threshold values are set on the basis of user operation.

14. The imaging control device according to claim 13, wherein
the user operation includes selection of imaging content, and
the controller sets the first and second threshold values corresponding to the selected imaging content.

15. The imaging control device according to claim 1, wherein
the acquisition circuitry acquires the radio wave strength information from a relay device that receives the radio wave from a communication device.

16. The imaging control device according to claim 1, wherein
the controller controls a report, to a user, of a state of the imaging control.

17. An imaging control method comprising:
acquiring radio wave strength information indicating a strength of a received radio wave having a frequency between 30 Hz and 300 GHz; and
performing imaging control that adapts processing of a moving image on a basis of a change of the acquired radio wave strength information,
wherein the imaging control is performed on the basis of the change of the radio wave strength information with regard to a first threshold value of a first strength of the radio wave and a second threshold of a second strength of the radio wave, and the imaging control that is performed differs when the strength of the radio wave indicated by the radio wave strength information reaches each of the first threshold value and the second threshold value.

18. An imaging control system comprising:
a communication device that includes communication circuitry that transmits a radio wave having a frequency between 30 Hz and 300 GHz; and
an imaging control device that includes
acquisition circuitry configured to acquire radio wave strength information indicating a strength of the radio wave received from the communication circuitry of the communication device, and
a controller configured to perform imaging control that adapts processing of a moving image on a basis of a change of the radio wave strength information acquired by the acquisition circuitry,
wherein the controller performs the imaging control on the basis of the change of the radio wave strength information with regard to a first threshold value of a first strength of the radio wave and a second threshold of a second strength of the radio wave, and the imaging control performed by the controller differs when the strength of the radio wave indicated by the radio wave strength information reaches each of the first threshold value and the second threshold value.

* * * * *